(12) United States Patent
Walton et al.

(10) Patent No.: US 6,542,488 B2
(45) Date of Patent: Apr. 1, 2003

(54) METHODS AND APPARATUSES FOR FAST POWER CONTROL OF SIGNALS TRANSMITTED ON A MULTIPLE ACCESS CHANNEL

(75) Inventors: Jay R. Walton, Westford, MA (US); John W. Ketchum, Watertown, MA (US); Steven J. Howard, Ashland, MA (US); Mark S. Wallace, Bedford, MA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/829,570

(22) Filed: Apr. 9, 2001

(65) Prior Publication Data

US 2001/0028638 A1 Oct. 11, 2001

Related U.S. Application Data

(63) Continuation of application No. 09/165,858, filed on Oct. 2, 1998, now Pat. No. 6,252,865.

(51) Int. Cl.⁷ ................................................ H04J 13/00
(52) U.S. Cl. ........................................ 370/335; 455/522
(58) Field of Search ................................ 370/335, 342, 370/449, 329, 331, 322, 337, 347, 349, 252; 455/450, 451–453, 501, 517, 522, 134; 711/216; 375/140, 130

(56) References Cited

U.S. PATENT DOCUMENTS

| | | | | |
|---|---|---|---|---|
| 6,169,731 B1 | * | 1/2001 | Stewart et al. | 370/332 |
| 6,173,162 B1 | * | 1/2001 | Dahlman et al. | 455/69 |
| 6,185,199 B1 | * | 2/2001 | Zehavi | 370/335 |
| 6,205,190 B1 | * | 3/2001 | Antonio et al. | 375/346 |
| 6,252,865 B1 | * | 6/2001 | Walton et al. | 370/335 |

* cited by examiner

*Primary Examiner*—Ken Vanderpuye
(74) *Attorney, Agent, or Firm*—Philip R. Wadsworth; Kent D. Baker; Albert J. Harnois

(57) ABSTRACT

A method and apparatus for controlling the transmission of signals from one or more of a plurality of mobile stations to a base station on a plurality of M multiple access channels. A power control information packet formed from a plurality of power control bits is transmitted from the base station to the one or more mobile stations. Each of the power control bits in the power control information packet has a position that is mapped to a selected access channel and to a time offset within the selected access channel. The power control information packet is received at a first mobile station. A message is then transmitted from the first mobile station to the base station on a first access channel and at a first time offset associated with the first access channel. The message is transmitted from the first mobile station at a power level determined in response to a first power control bit in the power control information packet. The first power control bit is located in a first position in the power control information packet, the first position being mapped to the first access channel and the first time offset.

18 Claims, 15 Drawing Sheets

METHODS AND APPARATUSES FOR FAST POWER CONTROL OF SIGNALS TRANSMITTED ON A MULTIPLE ACCESS CHANNEL

CROSS REFERENCE

This is a continuation application of application Ser. No. 09/165,858, filed Oct. 2, 1998, entitled "Methods and Apparatuses for Fast Power Control of Signals Transmitted on a Multiple Access Channel," now U.S. Pat. No. 6,252,865, issued Jun. 26, 2001 to Jay Rod Walton, et al.

BACKGROUND OF THE INVENTION

1. Field of the Invention

The present invention relates generally to mobile radio telephone systems. More particularly, the present invention relates to systems and methods for quickly controlling the output transmit power of signals sent from mobile stations to base stations on multiple access channels within a mobile radio telephone system and determining which from among many mobile stations has properly gained access to the multiple access channel.

2. Description of the Related Art

In CDMA radio telephone systems operating in accordance with the TIA/EIA-95 standard (the IS-95 standard), the Access Channel (R-ACH) is used for communications from the mobile station to the base station when the mobile station is not assigned to a dedicated channel such as a Traffic Channel (TCH). The R-ACH carries originations, page responses, registrations, and acknowledgments to messages sent by the base station on the Paging Channel. The R-ACH is transmitted at a constant rate of 4800 bps. This is in contrast to the Traffic Channel which is variable rate. Details of an exemplary CDMA system can be found in U.S. Pat. No. 4,901,307 entitled "Spread Spectrum Multiple Access Communication System Using Satellite Or Terrestrial Repeaters", which is assigned to the assignee of the present invention and incorporated herein in its entirety by reference. The IS-95 standard is set forth in the TIA/EIA Interim Standard entitled "Mobile Station—Base Station Compatibility Standard for Dual-Mode Wideband Spread Spectrum Cellular System", TIA/EIA/IS-95, dated July, 1993, the contents of which are also incorporated herein by reference.

On the R-ACH, the mobile station uses a long code spreading mask that is specific to the base station. In particular, a base station can have up to seven Paging Channels. Associated with each Paging Channel is one or more R-ACHs (up to 32 are permitted). Each R-ACH has a long code mask which determines the spreading sequence. The mask includes the identity of the base station associated with the channel, the Paging Channel to which the R-ACH is associated, and the number of the R-ACH. This provides a unique long code mask and thus a unique long code sequence for the particular R-ACH.

While certainly possible, the R-ACH is not operated in soft handoff. This is unlike the Traffic Channel which is operated in soft handoff. Furthermore, the R-ACH does not have fast power control as on the IS-95 Traffic Channel. On the Traffic Channel, the base station transmits a power control stream at 800 bps to the mobile station. BPSK modulation is used for the power control bit stream. One phase of the bit indicates that the mobile station is to increase its transmit power; another phase of the bit indicates that the mobile station is to decrease its transmit power.

The base station determines whether to have the mobile station increase or decrease its transmit power by controlling the received energy to noise density in the base station to a threshold. If the received energy to noise density is less than the threshold, the base station has the mobile station increase its transmit power; if the received energy to noise density is greater than the threshold, the base station has the mobile station decrease its transmit power. This is described more in IS-95 and in U.S. Pat. Nos. 5,056,109 and 5,265,119, both of which are entitled "Method and Apparatus for Controlling Transmission Power In A CDMA Cellular Telephone System" and assigned to the assignee of the present invention and incorporated by reference herein.

One reason for not having fast power control on the R-ACH is that multiple mobile stations may transmit on the same R-ACH, thus making it hard to control with one power control stream. Furthermore, if there are many power control streams controlling one channel, it is not clear how to map the power control stream to the mobile station. U.S. Pat. No. 5,604,730 (hereinafter '730 patent) which is assigned to the applicant describes how one power control stream can be used to control a number of mobile stations. As described below, the technique taught in '730 patent is also applicable to the invention described herein.

In CDMA systems operating in accordance with the IS-95 standard, the mobile station determines a level at which to transmit on the R-ACH based upon an open loop power control estimate, adjusted by some overhead parameters. More particularly, under the IS-95 standard, the mobile station attempts an access on a R-ACH by sending one or more access probes. An access probe is the message which the mobile station is trying to send to the base station. The mobile station starts by sending an access probe; if the mobile station does not receive an acknowledgment to this access probe, the mobile station increases its transmit power (by a value given in overhead messages) and sends the probe again. This continues until the mobile station receives an acknowledgment or the mobile station has reached the limit of access probes which are permitted.

In any multi-access system, one key aspect of system design is congestion control. From the perspective of the R-ACH, congestion control is responsible for controlling the number of mobile stations simultaneously accessing a R-ACH. Congestion control is important since when too many mobile stations access the system, the system is unable to handle them. Specifically, there can be more transmissions on the reverse link than the base station is able to receive. This is a physical hardware limit. Secondly, the reverse CDMA channel has a capacity limit. When the capacity limit is reached, then the required transmit power of the mobile stations goes to infinity—thus, not permitting communications. Thus, it is necessary to keep the load on the channel within limits. Since the R-ACHs typically share the reverse channel with traffic channels, a certain fraction of the reverse capacity is typically allocated to the R-ACHs. It should be noted that excessive loading on the R-ACHs can create a substantial load on the reverse link, thus limiting the performance of mobile stations which are already assigned to a Traffic Channel. It should also be noted that the R-ACH itself is somewhat unstable as the actual throughput of the R-ACH may decrease after a certain load is reached on the reverse link. In order to control this load, the IS-95 standard has a number of congestion control mechanisms. These include access probe backoffs, access sequence backoffs, channel randomizations, and PN randomizations. However, IS-95 lacks any mechanism for quickly enabling and disabling access to a R-ACH in order to control congestion.

These problems and deficiencies are recognized and solved by the present invention in the manner described below.

SUMMARY OF THE INVENTION

One aspect of the invention is directed to a method and apparatus for controlling the transmission of signals from one or more of a plurality of mobile stations to a base station on a plurality of M multiple access channels. A power control information packet formed from a plurality of power control bits is transmitted from the base station to the one or more mobile stations. Each of the power control bits in the power control information packet has a position that is mapped to a selected access channel and to a time offset within the selected access channel. The power control information packet is received at a first mobile station. A message is then transmitted from the first mobile station to the base station on a first access channel and at a first time offset associated with the first access channel. The message is transmitted from the first mobile station at a power level determined in response to a first power control bit in the power control information packet. The first power control bit is located in a first position in the power control information packet, the first position being mapped to the first access channel and the first time offset.

In accordance with a further aspect, the invention is directed to a method and apparatus for controlling the transmission of signals from two or more of a plurality of mobile stations to a base station on a plurality of M multiple access channels. A power control information packet formed from a plurality of power control bits is transmitted from the base station to one or more mobile stations. Each of the power control bits in the power control information packet has a position that is mapped to a selected access channel. The power control information packet is received at a first mobile station and a second mobile station. Messages are then simultaneously transmitted from the first mobile station and the second mobile station to the base station on a first access channel. The messages from the first and second mobile stations are transmitted on the first access channel at power levels that are determined in response to only a first power control bit in the power control information packet, wherein the first power control bit is located in a first position in the power control information packet, and the first position is mapped to the first access channel.

In accordance with a further aspect, the invention is directed to a method and apparatus for controlling the transmission of signals from one or more of a plurality of mobile stations to a base station on one or more of a plurality of multiple access channels. A power control information packet formed from a plurality of power control bits is transmitted from the base station to one or more mobile stations. The power control bits in the power control information packet are transmitted using a modulation that permits each of the power control bits to assume one of first, second and third different states. The power control information packet is received at a first mobile station, and the first mobile station then identifies a state of a first power control bit associated with a first access channel. One of first, second or third operations is then performed at the first mobile station if the state of the first power control bit corresponds to the first state, wherein the first operation corresponds to initiating the transmission of message information from the first mobile station to the base station on the first access channel, the second operation corresponds to inhibiting the initiation of transmission of message information from the first mobile station to the base station on the first access channel, and the third operation corresponds to ceasing the transmission of message information from the first mobile station to the base station on the first access channel. The output power level of the first mobile station on the first access channel is increased if the state of the first power control bit corresponds to the second state, and the output power level of the first mobile station on the first access channel is decreased if the state of the first power control bit corresponds to the third state.

In accordance with yet a further aspect, the invention is directed to a method and apparatus for controlling the transmission of signals from one or more of a plurality of mobile stations to a base station on a plurality of M multiple access channels. A power control information packet formed from a plurality of power control bits is transmitted from the base station to one or more mobile stations. Each of the power control bits in the power control information packet has a position that is mapped to a selected access channel and to a time offset within the selected access channel. The base station next determines whether a mobile station accessed a first access channel during a time interval corresponding to a first time offset. If a mobile station accessed the first access channel during the time interval corresponding to the first time offset, then a first power control bit having a first position within the power control information packet is mapped to the first access channel and the first time offset. If a mobile station failed to access the first access channel during the time interval corresponding to the first time offset, then the first power control bit having the first position within the power control information packet is mapped to the first access channel and a second time offset associated with the first access channel.

In accordance with yet a still further aspect, the invention is directed to a method and apparatus for performing an access channel handoff for a mobile radio unit as the mobile radio unit moves from a first cell in a mobile radio telephone system to a second cell within the mobile radio system. At least one power control bit from a first base station associated with the first cell is transmitted to the mobile radio unit. The power control bit from the first base station is transmitted at a first time interval that corresponds to a first access channel associated with the first base station. At least one power control bit from a second base station associated with the second cell is also transmitted to the mobile radio unit. The power control bit from the second base station is transmitted at a second time interval, that may correspond to the first time interval used by the first base station. The power control bit from the second base station that corresponds to the access channel that was associated with the first base station. Each of the power control bits in the power control information packet has a position that is mapped to a selected access channel and to a base station associated with the selected access channel. The mobile radio unit receives the power control packet from the first base station and the power control packet from the second base station, determines the corresponding power control bits, and then determines the state of the power control bits. If the state indicates that a message is to be transmitted and the mobile station has a message to transmit, then the mobile station transmits the message on a selected access channel. Each of a set of prescribed base stations attempts to receive the transmission on the selected access channel and then sets the corresponding bit in the power control information packet in accordance with the received signal to noise ratio.

BRIEF DESCRIPTION OF THE DRAWINGS

The features, objects and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Basic Fast Access Channel Power Control

Figure 1:
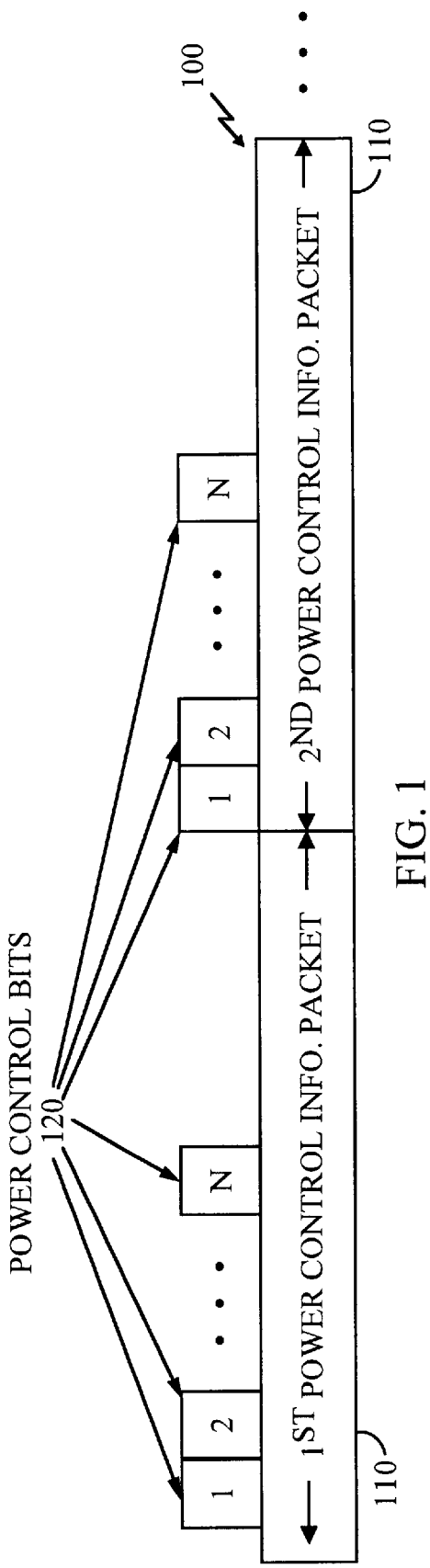
FIG. 1 is a diagram showing the structure of a bit stream formed from a plurality of power control information packets, in accordance with the present invention.

Referring now to FIG. 1, there is a diagram showing the structure of a bit stream 100 formed from a plurality of power control information packets 110, in accordance with the present invention. As explained more fully below, in the present invention the information included in power control information packets 110 is transmitted from base stations to mobile stations in a radio telephone system in order to control the output power of transmissions from the mobile stations to the base stations on one or more multiple access channels such as, for example, a reverse access channel (R-ACH) on a CDMA cellular system operating in accordance with the IS-95 standard. In addition, and as explained below, the information included in the power control information packets is used to regulate access to the multiple access channels by the mobile stations. The power control packets can be sequential on a separate channel as is shown in FIG. 1 or can be intermixed with data on a separate channel. This intermixing is well understood by those skilled in the art.

Each power control information packet 110 is comprised of N power control bits 120. In the embodiment shown in FIG. 1, each power control bit 120 in an power control information packet 110 maps to a single R-ACH and is used to control the output power on that R-ACH. Thus, the power control bit 120 labeled 1 controls the output power level of a mobile station transmitting on R-ACH (1), the power control bit labeled 2 controls the output power of a mobile station transmitting on R-ACH(2), and so on. In one embodiment, each of the power control bits is modulated in accordance with a combination of OOK (on-off keying) and BPSK modulation and can therefore assume three states, namely off, 0 degrees and 180 degrees. The second and third states (i.e. 0 and 180 degrees) are respectively used to convey on status and power-up and power-down commands to the mobile station in response to which the mobile station will, for example, either raise its output transmit power by 1 dB (if a power-up command is received) or lower its output transmit power by 1 dB (if a power-down command is received). Other power control steps sizes can well be used to optimize the system. Transmission of a power control bit 120 in the first state (i.e., 0 degrees) is used in the present invention for regulating access to the R-ACH associated with (i.e., mapped to) the power control bit by mobile stations. In a preferred embodiment, each power information control packet 110 is 1.25 ms in duration, and the control packets 110 are transmitted from a base station to the mobile stations serviced by the base station on a forward link common control or power control channel.

In a simple version of the present invention, the power control bits 120 are transmitted continuously from a base station as a stream of BPSK modulated symbols. When a mobile station begins to access a particular R-ACH, the mobile station begins to pay attention to the power control bit stream 100 and, in particular, to the power control bit 120 that is mapped to the particular R-ACH that the mobile station has begun to access. If the power control bit 120 corresponding to the R-ACH accessed by the mobile station indicates that the mobile station is to increase its transmit power, the mobile station does such; similarly, if the power control bit 120 indicates that the mobile station is to decrease its transmit power, it does such. In one preferred embodiment, the base station transmits the power control bit 120 as an increase power command when the base station is not receiving any transmissions on the R-ACH associated with the power control bit (i.e., before the mobile station has attempted to access the R-ACH corresponding to the particular power control bit 120). Transmitting the power control bit 120 as an increase power command when the base station is not receiving any transmissions on the R-ACH associated with the power control bit causes the mobile station to increase its power level at the beginning of an access if, for example, the mobile station is transmitting at too low a power level.

Using fast power control as described herein permits accurate power control of the mobile station on the R-ACH, similar to that which can be done on the reverse traffic channel (R-TCH) of a CDMA system. Such fast power control is important for maximizing capacity of a mobile radio telephone system. Another advantage of the fast control is that it permits the mobile station to begin an R-ACH access by transmitting its signal with more power than is needed and then be rapidly corrected to the desired power level once the base station has acquired the mobile station's transmission.

Figure 2:
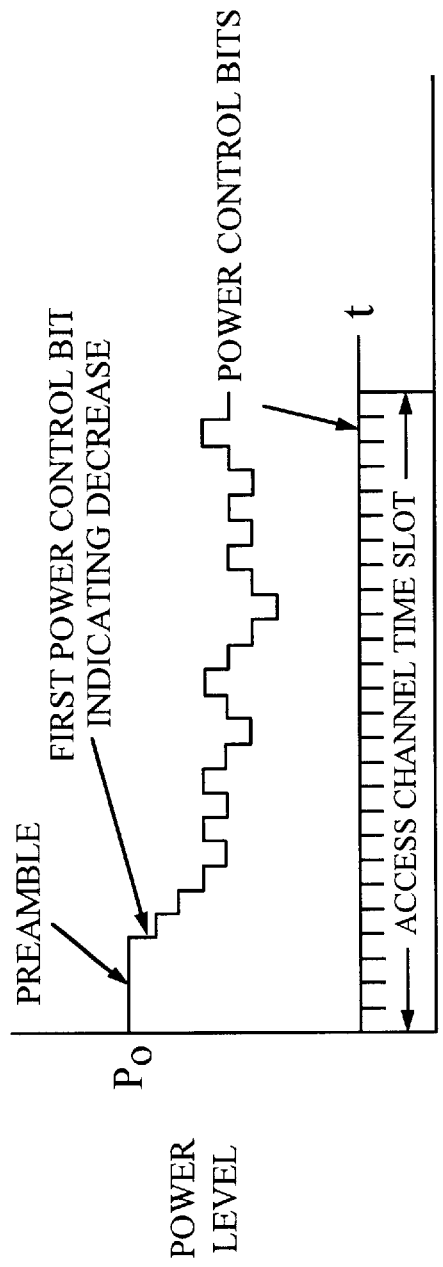
FIG. 2 is a timing diagram illustrating an exemplary access of a channel by a mobile station using the power control information packets of the present invention.

Referring now to FIG. 2, there is shown a timing diagram illustrating an exemplary access of a R-ACH by a mobile station using the power control information packets 110 of the present invention. As shown in FIG. 2, the access by the mobile unit to the R-ACH occurs during an access channel time slot. While a preferred embodiment uses time slots for the R-ACH, it should be noted that the teachings of this innovation do not require that the R-ACH be time slotted and are thus applicable to systems which are not slotted.

At the beginning of the access channel time slot, the mobile station initially transmits a message preamble at an initial power level P0. In one embodiment, the initial power level used during transmission of the message preamble corresponds to a power level that is about 3 dB higher than the power level of a first access probe that would otherwise be used by the mobile station to access the R-ACH under the IS-95 standard. After transmission of the message preamble, the mobile station starts to demodulate the power control information packets 110 and, in particular, the mobile station begins monitoring the value of the power control bit 120 in each of the power control information packets corresponding to the R-ACH now in use by the mobile station. In response to the values stored in these power control bits, the mobile station adjusts the output power of its transmissions either UP or DOWN (e.g., by plus or minus 1 dB) in response to each power control bit 120 associated with the R-ACH being used by the mobile station.

In accordance with a further aspect, the base station will wait until it detects a transmission from a mobile station (i.e., the mobile station will wait until it detects the message preamble) and has acquired transmissions from a mobile station before turning on the power control bit stream. The base station will determine whether to command the mobile station to power-up or power-down based on the power level of the received signal from the mobile station. More specifically, the base station will compare the power level of the received signal to a threshold; if the received signal is below the threshold, the base station will use the power control information packet to send a power-up command to the mobile station, otherwise, the base station will use the power control information packet to send a power-down command to the mobile station.

In the embodiments described above, each power control bit 120 in the power control information packet 110 is mapped to a single R-ACH. In such embodiments, if there are N power control bits 120 in each power control information packet 110, such information packets can be thought of as forming N bit streams each of which can be used to control one R-ACH as described above. One aspect of a multiple access channel such as the R-ACH is that multiple mobile stations can simultaneously access and transmit on such a channel. U.S. Pat. No. 5,604,730, assigned to the assignee of the present invention and incorporated herein in its entirety by reference, describes a method wherein a single power control bit stream may be used to control the power of multiple mobile stations operating simultaneously. The teachings of U.S. Pat. No. 5,604,730 can therefore be combined with the embodiment of the power control information packet 110 described above (i.e., where there is one-to-one mapping of the power control bits 120 to the R-ACH's) to permit the power levels of multiple mobile stations operating on the same R-ACH to be simultaneously controlled quickly using a single power control bit stream.

Figure 3:
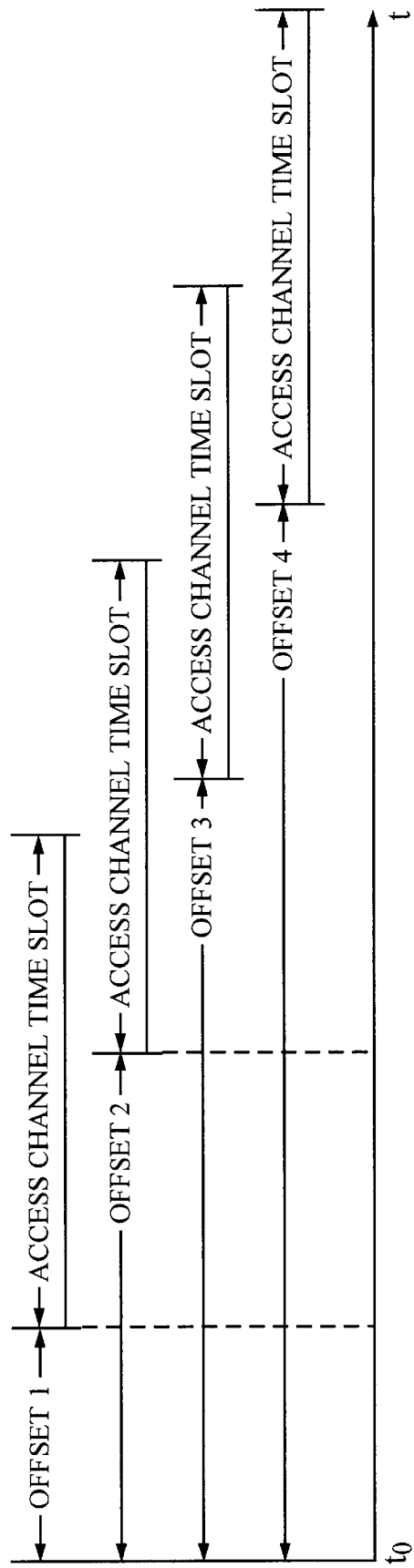
FIG. 3 is a timing diagram showing the staggering of access channel time slots within an access channel at different offsets, in accordance with the present invention.

As an alternative to the embodiment described immediately above, more than one power control bit stream can be used to control the operating power of multiple mobile stations operating on the same R-ACH. In this alternate embodiment, a different mapping structure is used to map the power control bits 120 to the mobile stations accessing on a specific R-ACH. More particularly, in this alternate embodiment the access channel time slots used for transmission by the mobile units are staggered in time by multiple offsets within each R-ACH as shown in FIG. 3. Each offset indicates a time when a mobile station may begin transmitting on a specific R-ACH. The time interval between successive time offsets is preferably greater than the largest path delay range (including maximum multipath delay) associated with transmissions from the base station to the mobile station in order to avoid ambiguities in determining which power control bit stream corresponds to a particular R-ACH and offset. In one embodiment of the invention, the Access Channel slots are divided into frames as is done in IS-95. In the instance of IS-95, a frame is 20 ms in duration. Thus, a slot is comprised of S frames, so that the slot is 20×S ms in duration, where S is either a fixed value or transmitted to the mobile station in system overhead information. To simplify a system design, it may be preferable to select the time interval between time offsets to be an integer number W of frames, where W is less than S.

In this embodiment, one power control bit 120 is used to control the power of mobile station(s) that begin their transmission on a given R-ACH in the first access slot (i.e., after offset 1), another power control bit 120 is used to control the power 120 of mobile station(s) that begin their transmissions on the same R-ACH in the second access slot (i.e., after offset 2), and so on. Although FIG. 3 shows four staggered accesses on a given R-ACH, it will be understood by those skilled in the art that any number of staggered accesses may be used on a single channel.

Referring still to the embodiment discussed in the paragraph above where each R-ACH is divided by multiple offsets to create multiple staggered access times for transmissions by mobile stations, an exemplary mapping of the power control bits 120 to the multiple R-ACH's available to the mobile stations for transmissions and the staggered access times available for such transmissions is shown in Table I below. The mapping shown in Table I assumes that there are M R-ACH's available to the mobile stations and K staggers (or offsets) per R-ACH, and that there is a one-to-one correspondence between each power control bit 120 and each offset within a given R-ACH. Given this one-to-one mapping, M×K power control bits 120 are needed in each power control information packet 110 in this embodiment of the invention.

TABLE I

| Power Control Bit Position | Access Channel Number | Offset Position |
|---|---|---|
| 1 | R-ACH1 | 1st Offset |
| 2 | R-ACH1 | 2d Offset |
| 3 | R-ACH1 | 3d Offset |

TABLE I-continued

| Power Control Bit Position | Access Channel Number | Offset Position |
|---|---|---|
| ... | ... | ... |
| k | R-ACH1 | kth Offset |
| k + 1 | R-ACH2 | 1st Offset |
| k + 2 | R-ACH2 | 2d Offset |
| k + 3 | R-ACH2 | 3d Offset |
| ... | ... | ... |
| 2k | R-ACH2 | kth Offset |
| 2k + 1 | R-ACH3 | 1st Offset |
| 2k + 2 | R-ACH3 | 2d Offset |
| 2k + 3 | R-ACH3 | 3d Offset |
| ... | ... | ... |
| 3k | R-ACH3 | kth Offset |
| ... | ... | ... |
| (M − 1)*k | R-ACH (M) | 1st Offset |
| ((M − 1)*k) + 1 | R-ACH (M) | 2d Offset |
| ((M − 1)*k) + 2 | R-ACH (M) | 3d Offset |
| M*k | R-ACH (M) | kth Offset |

In order to reduce the forward link loading and slightly increase capacity, a base station using a power control system that conforms with the mapping shown in Table I above will, in a preferred embodiment, refrain from transmitting the power control bit associated with a particular R-ACH and a given offset until the base station receives a transmission from a mobile station on the particular R-ACH and offset. In this situation, if the base station is using BPSK modulation for transmission of the power control bits, the base station will simply not transmit the modulated symbol for a given power control bit until the base station receives a transmission from a mobile station on the particular R-ACH and offset associated with the power control bit. Thus, referring to FIG. 2, the base station would not begin transmitting the corresponding power control bit until it has detected the preamble of an R-ACH transmission. The R-ACH preamble is defined, for example, in section 6.1.3.2.2.1 of the IS-95 standard.

In a small modification to the embodiment discussed in the paragraph above, the base station begins transmitting the power control bits associated with a particular R-ACH and offset at the beginning of an access channel time slot; if an access on the particular R-ACH and offset is not detected by the base station within a given interval, then the base station stops transmitting the power control bits associated with the particular R-ACH and offset. This embodiment permits the base station to indicate that the mobile station is to increase its transmit power level at the beginning of the transmission on an access channel time slot. Specifically, the base station will begin transmitting power up commands using a zero degrees phase shift at the beginning of the slot. If an access is detected, the base station will then transmit a sequence of power-up and power-down commands as needed to control the power of the accessing mobile station or stations. If an access is not detected, the base station will stop transmitting the power control bit in order to reduce its transmit power and thus increase capacity.

Using Power Control Bits For Enabling/Disabling Access To An Access Channel

In accordance with further aspects of the invention, the power control bits 120 in the power control information packet can be used for congestion control on the R-ACH, i.e., the power control bits can be used to enable/disable access on a R-ACH by a mobile station. In one such embodiment, when no mobile station is accessing a given R-ACH, the base station does not transmit the power control bit corresponding to a particular R-ACH, thus indicating that the channel is idle. When an acceptable number of mobile stations are accessing the given R-ACH, then the base station begins transmitting the power control bit associated with the given R-ACH and uses it to indicate to the mobile station(s) accessing the system that they should increase/decrease their transmission power (i.e., if the base station is using BPSK modulation for transmission of the power control bits, the base station will simply transmit a plus or minus 180 degree BPSK modulated symbol for a given power control bit.) When, for example, the given R-ACH becomes congested as a result of too many mobile stations operating on the channel, the base station does not begin or stops transmitting the power control bit associated with the given R-ACH to indicate to the mobile stations that they are to cease transmitting on the R-ACH. This aspect of the invention can be easily extended to the case where each R-ACH is divided by multiple offsets (as shown in FIG. 3). In this case, when no mobile station is accessing a given R-ACH using a given offset, the base station does not transmit the power control bit corresponding to particular R-ACH and offset thus indicating that the R-ACH and offset are idle. When an acceptable number of mobile station(s) are accessing the given R-ACH and offset, then the base station begins transmitting the power control bit associated with the given R-ACH and offset, and uses it to indicate to the mobile station(s) accessing the system that they should increase/decrease their transmission power. When the given R-ACH and offset become congested as a result of too many mobile stations operating on the R-ACH and offset, the base station stops transmitting the power control bit associated with the given R-ACH and offset to indicate to the mobile stations that they are to cease transmitting on the R-ACH and offset.

Figure 7:
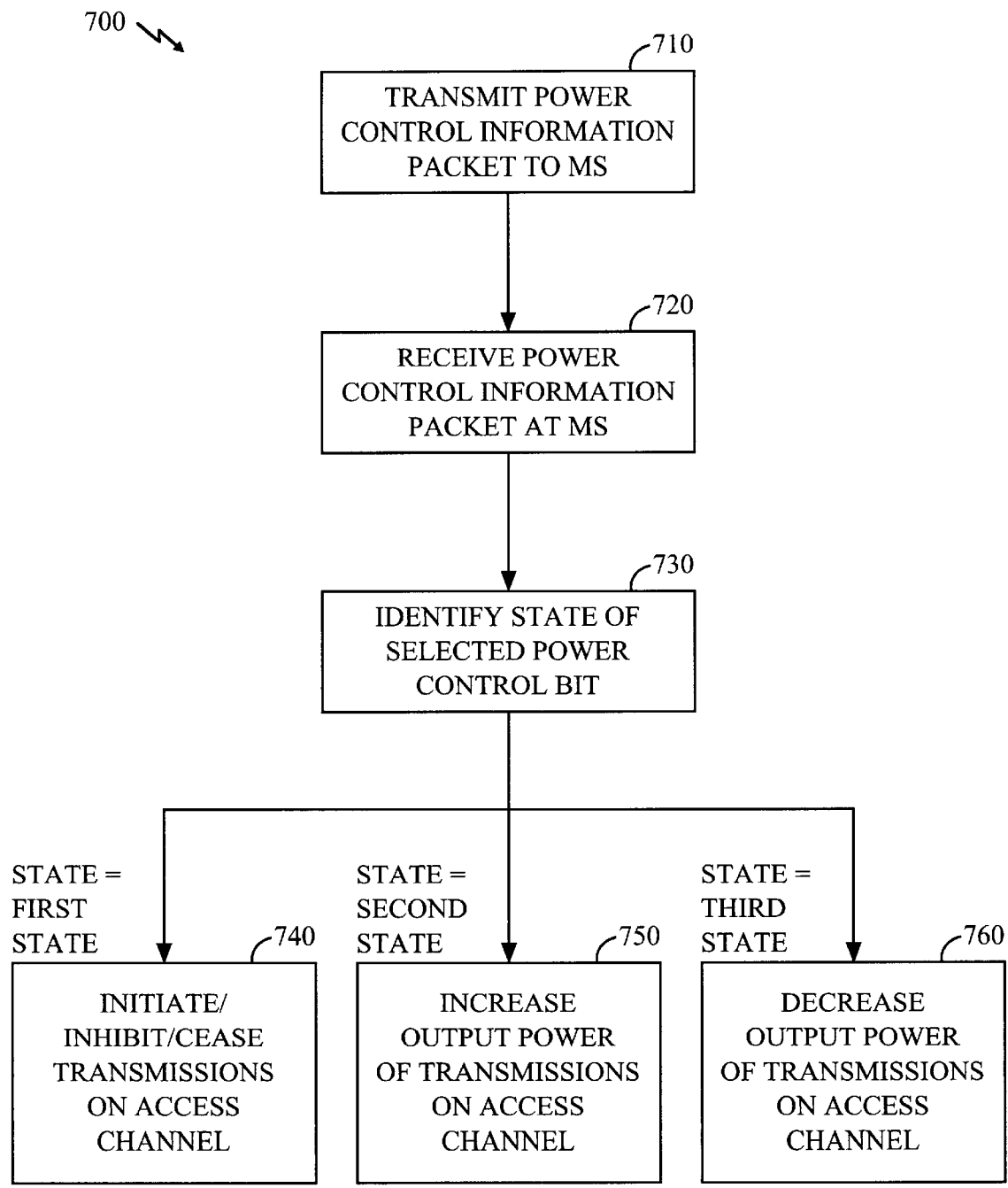
FIGS. 7, 7A, 8 and 8A are flow diagrams of systems for regulating access to an access channel using a power control bit that is capable of assuming three different states, in accordance with the present invention.
Figure 7A:
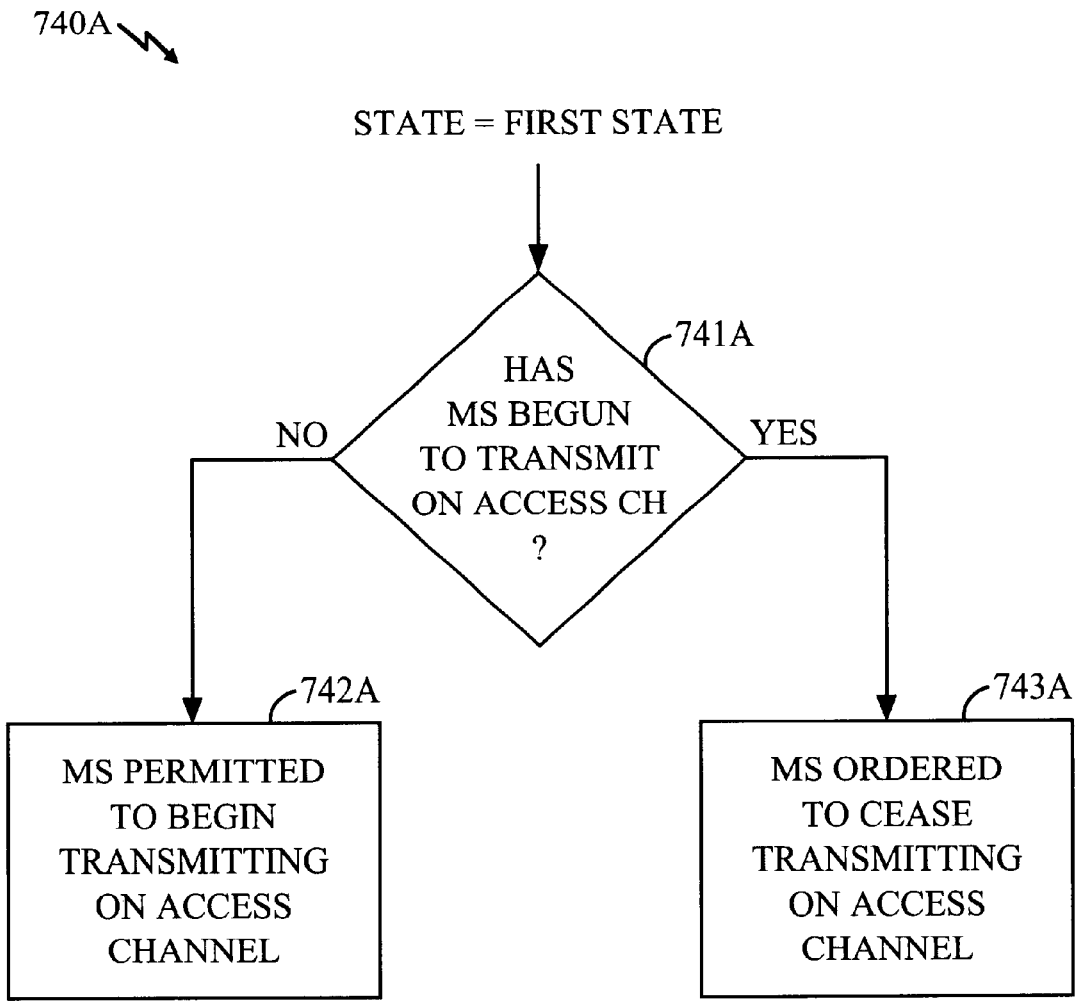

The embodiments discussed in the paragraph above are shown generally in FIGS. 7 and 7A, which depict a flow diagram of a system for regulating access to an access channel using a power control bit that is capable of assuming three different states. In step 710, a power control information packet formed from a plurality of power control bits is transmitted from the base station to one or more mobile stations. The power control bits in the power control information packet are transmitted using a modulation comprised of OOK and BPSK that permits each of the power control bits to assume one of first, second and third different states (i.e., state 1=off degrees, state 2=0 degrees, and state 3=180 degrees). In step 720, the power control information packet is received at a mobile station, and in step 730 mobile station then identifies the state of the power control bit associated with a given access channel. In step 740, one of first, second or third operations is then performed at the mobile station if the state of the power control bit corresponds to the first state, wherein the first operation corresponds to initiating the transmission of message information from the mobile station to the base station on the given access channel, the second operation corresponds to inhibiting the initiation of transmission of message information from the mobile station to the base station on the given access channel, and the third operation corresponds to ceasing the transmission of message information from the mobile station to the base station on the given access channel. In the preferred embodiment shown in FIG. 7A (labeled steps 741a–743a), if the power control bit is in the first state (not transmitted) and the mobile station has not yet begun to transmit on the given access channel, then in step 742a the mobile station is permitted to access the channel; otherwise, the mobile station is ordered to cease transmitting on the given access channel (step 743a). Referring again to FIG. 7, if the mobile station is engaged in transmissions on the given access channel and the base station transmits the power control bit for the channel in its second or third state, then the output power level of the mobile station on the access channel is increased if the state of the power control bit corresponds to the second state (step 750), and the output power level of the mobile station on the access channel is decreased if the state of the power control bit corresponds to the third state (step 760).

As indicated previously, certain alternatives of this invention do not require the base station to transmit during the preamble portion of the access channel transmission. Thus, in the preferred embodiment shown in FIG. 7A (labeled steps 741*a*–743*a*), if the power control bit is in the first state (the power control bit is not transmitted) and the mobile station has not yet begun to transmit on the given access channel, then in step 742*a* the mobile station is permitted to access the channel; if the power control bit is in the first state (the power control bit is not transmitted) and the mobile station has is transmitting the preamble on the given access channel, then in step 742*a* the mobile station is permitted to continue transmitting on the given access channel; otherwise, the mobile station is ordered to cease transmitting on the given access channel (step 743*a*). Referring again to FIG. 7, if the mobile station is engaged in transmissions on the given access channel and the base station transmits the power control bit for the channel in its second or third state, then the output power level of the mobile station on the access channel is increased if the state of the power control bit corresponds to the second state (step 750), and the output power level of the mobile station on the access channel is decreased if the state of the power control bit corresponds to the third state (step 760).

Figure 4:
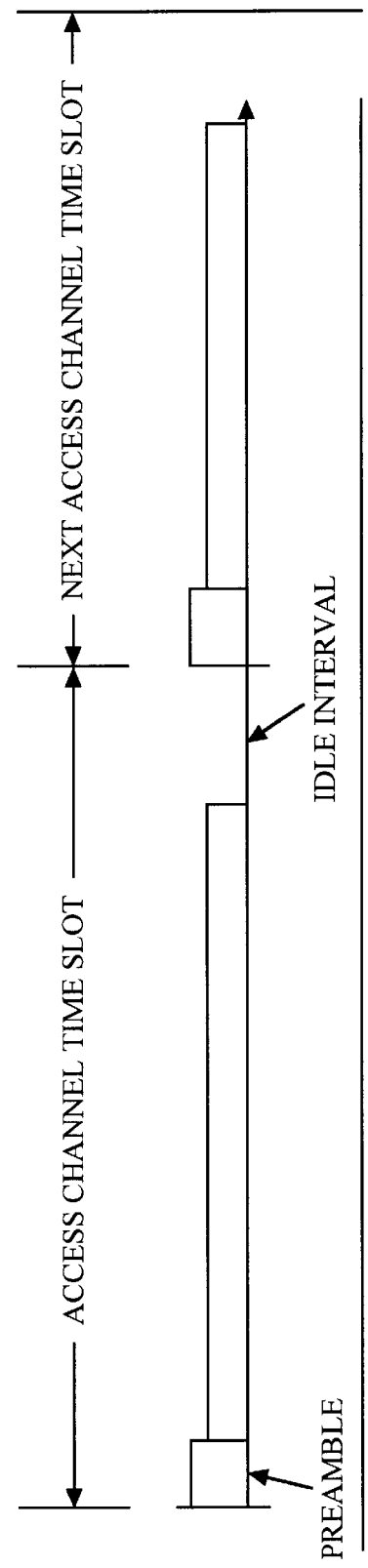
FIG. 4 is a diagram showing the structure of an access channel time slot having an idle interval, in accordance with the present invention.
Figure 8:
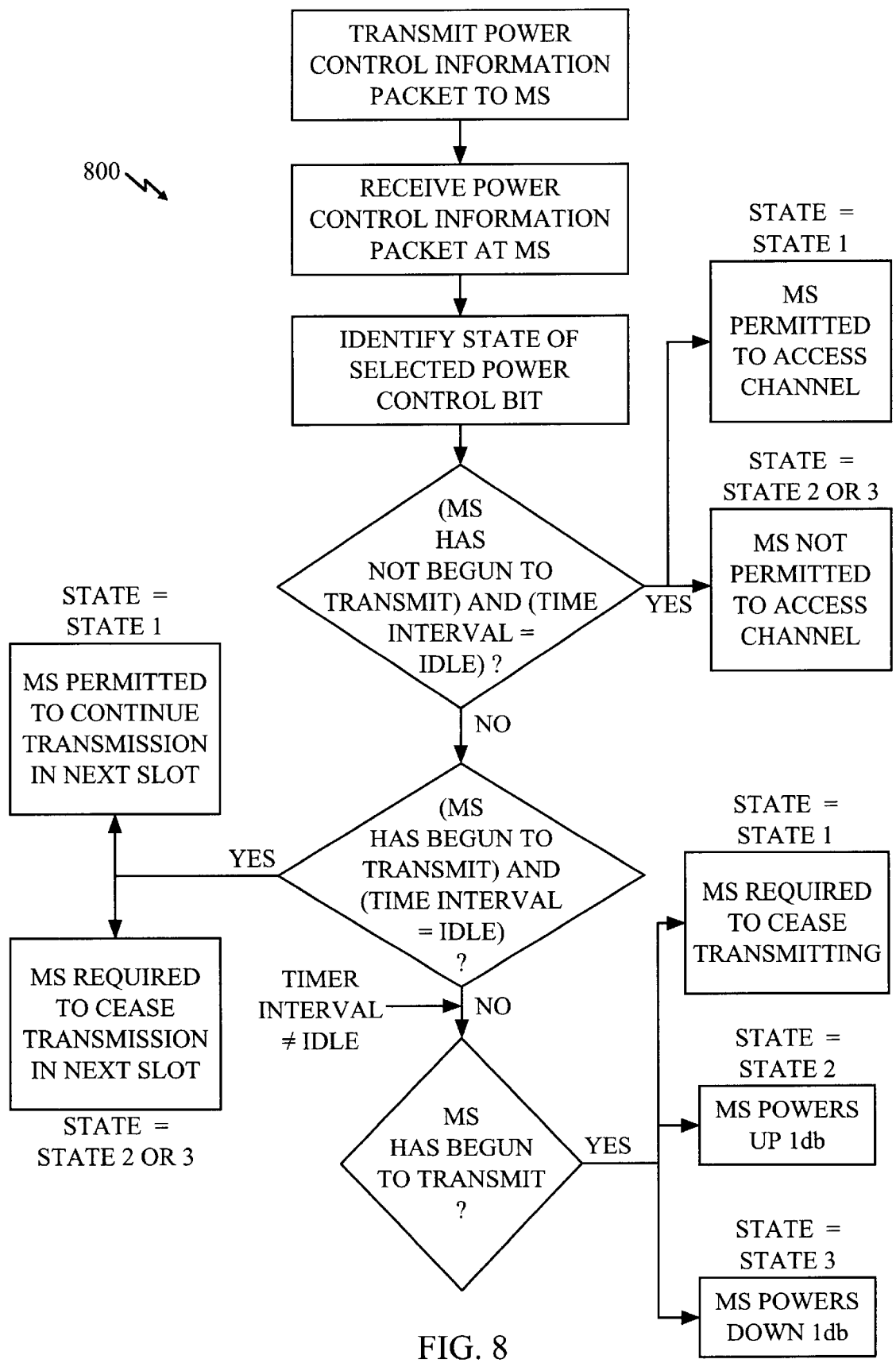
Figure 8A:
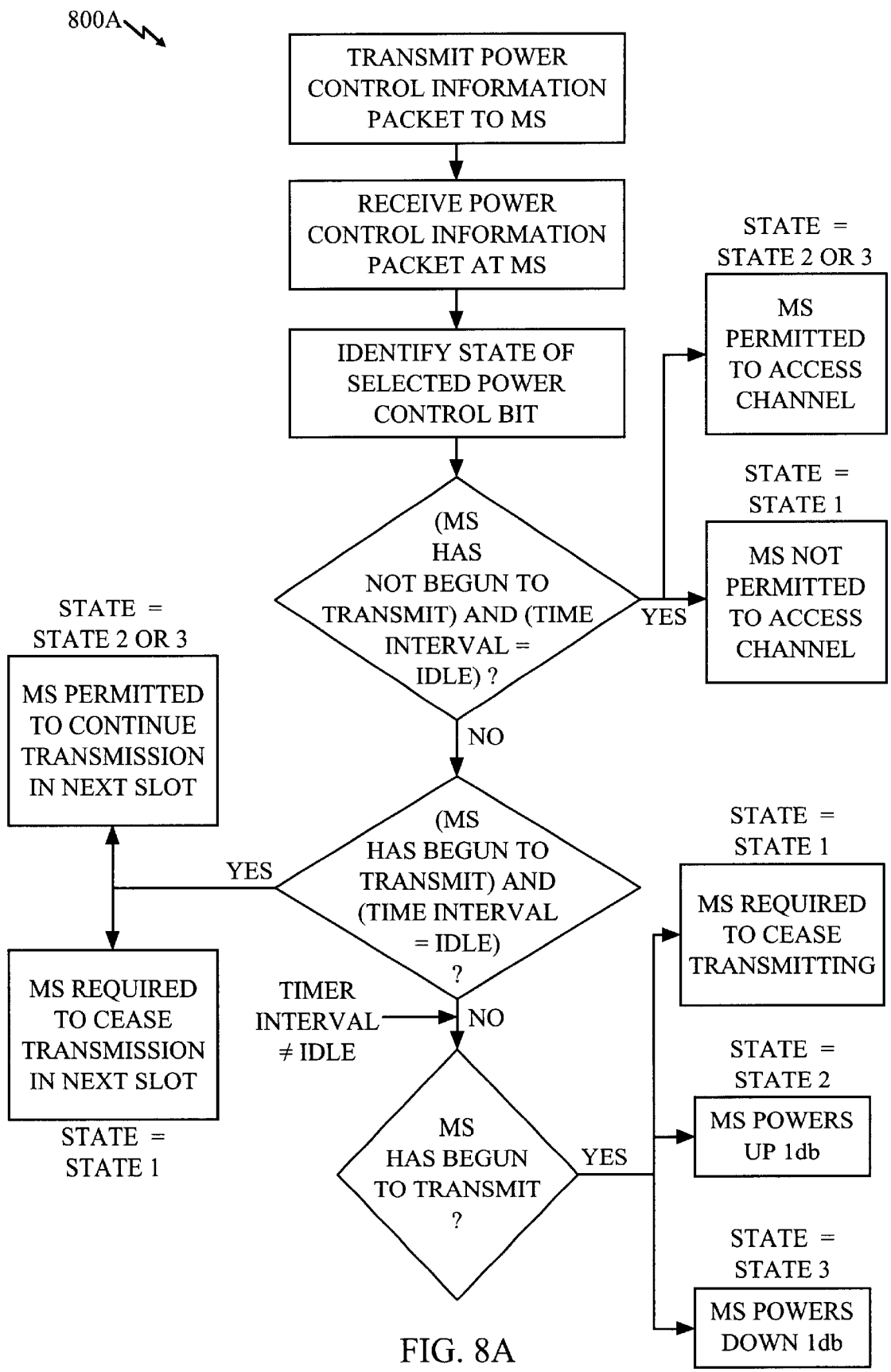

Referring now to FIG. 4, in accordance with yet a further aspect, a small idle interval is preferably included at the end of each access channel time slot in order for the base station to be able to turn off the power control bits, thus indicating that the channel is idle and mobile stations can access the channel in the next slot. If the base station does not turn off the power control bit corresponding to the channel during this idle interval, then the mobile stations are not permitted to transmit during the next slot. In this embodiment, the base station normally will not transmit the power control bit for a given R-ACH during the idle interval signaling to the mobile stations that it is acceptable to access the R-ACH during the next slot. If one or more mobile stations begin to access the R-ACH during the next access channel time slot, then the base station will begin to transmit power control bits corresponding to the R-ACH (e.g., the base station will transmit zero or 180 degree BPSK symbols for the power control bit), thus causing the mobile station to increase or decrease its transmission power. Referring still to FIG. 4, in a situation in which the base station did not desire to permit access to the R-ACH or in a situation where the base station wanted one or more mobile stations to cease transmitting on the R-ACH, the base station would transmit power control bits (e.g., the base station will transmit zero or 180 degree BPSK symbols for the power control bit) during the idle interval-thus indicating to the mobile stations that they are not to access the R-ACH during the following slot. This embodiment of the invention is shown generally in FIG. 8. A further alternative embodiment is shown in FIG. 8A. The embodiment of FIG. 8A is otherwise identical to that of FIG. 8, except in FIG. 8A the base station transmits power control bits during the idle interval in order to indicate that mobile stations are permitted to access the R-ACH during the next time slot.

The idle interval used with the embodiment discussed above should preferably be at least be several power control information packets in length plus some allowed processing time before the succeeding access channel time slot so that the mobile station can determine whether it is allowed to transmit or not during the slot. This preferred length results from the fact that a single power control bit is not encoded with error correction or detection information and is transmitted at a relatively low power to enhance system capacity. Thus, a single power control bit is not very reliable in its transmission. This is quite acceptable for the usage of power control during ongoing transmission of message information (i.e., within the middle of an access channel time slot) because, although a single bit error during this period will cause the mobile station to change its power in the wrong direction, this error will be quickly corrected by a succeeding power control bit. However, since the mobile station cannot reliably detect whether a single power control bit is transmitted, several power control bits corresponding to a given R-ACH should be accumulated during the idle interval in order to reliably determine whether the mobile station is permitted access to the R-ACH or is being ordered to cease transmissions on the R-ACH.

Figure 5:
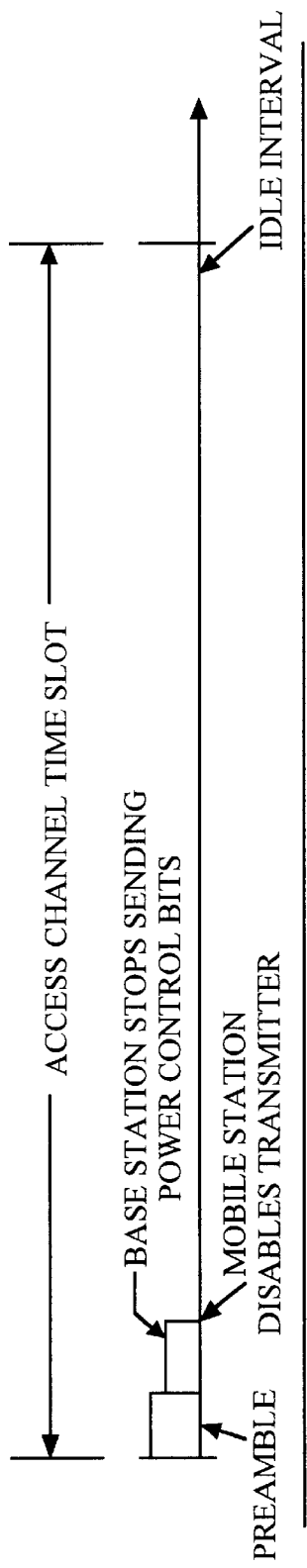
FIG. 5 is a timing diagram showing a method for disabling access by a mobile station to an access channel, in accordance with the present invention.

In accordance with yet a further aspect of the invention, FIG. 5 illustrates a system for disabling accesses to a R-ACH during the middle of an access control slot. Where there are more accesses to a given R-ACH in an access channel time slot than the base station desires to process, the base station preferably turns off the power control bits corresponding to the R-ACH after some time interval T in the middle of the time slot. The time interval T is the time required by the base station to determine that there are more accesses than desired. After accumulating several of such bits, the mobile station determines that the base station is not transmitting power control bits corresponding to the R-ACH and the mobile station disables its transmissions on the R-ACH (during the middle of the time slot).

It should be noted that in an alternative embodiment, the idle interval can be during the transmission of the preamble, thus not requiring any dead time on the channel. In this case, the base station does not transmit during the preamble to signal to the mobile station that it may transmit. However, this embodiment has the disadvantage that mobile stations cannot be power controlled during the preamble. A further alternative is to have the mobile stations transmit during the preamble if the mobile stations are allowed to access the system. Thus, a base station not transmitting during the preamble is an indication to the mobile stations that they are not permitted to transmit during the time slot.

The embodiment described above use three states of a single power control bit: off, increase power, and decrease power. In addition, the transmission of a power control bit at different times indicates whether a given R-ACH is idle and mobile stations can access the R-ACH, whether mobile stations are not permitted to access the R-ACH, and whether mobile stations are to stop transmitting on the R-ACH. In the embodiments discussed above, BPSK modulation was used to achieve these three states with a single power control bit as described above. It should be noted that other modulation schemes can be used to indicate these various states. For example, each power control bit can be encoded using QPSK modulation. This provides up to 4 different indications. It will be understood by those skilled in the art that other modulation schemes could alternatively be used to encode the power control bit. In a further alternative embodiment, a single power control bit can be used to govern all R-ACH's and will indicate whether any mobile station is permitted to access the system. This single bit can be used to govern all R-ACHs. This approach can be used to avoid the use of the idle time described above.

Re-Using Power Control Bits

FIG. 3 (described above) showed an arrangement using staggered R-ACHs. With these staggered R-ACHs, a power control bit could be assigned (or mapped) to each staggered slot for each R-ACH. In accordance with a further aspect of the invention, power control bits that are not used for one staggered time slot (i.e., a time slot associated with a particular offset) are available to be reused for controlling access on a subsequent staggered slot (i.e., a time slot associated with a later offset).

Figure 6:
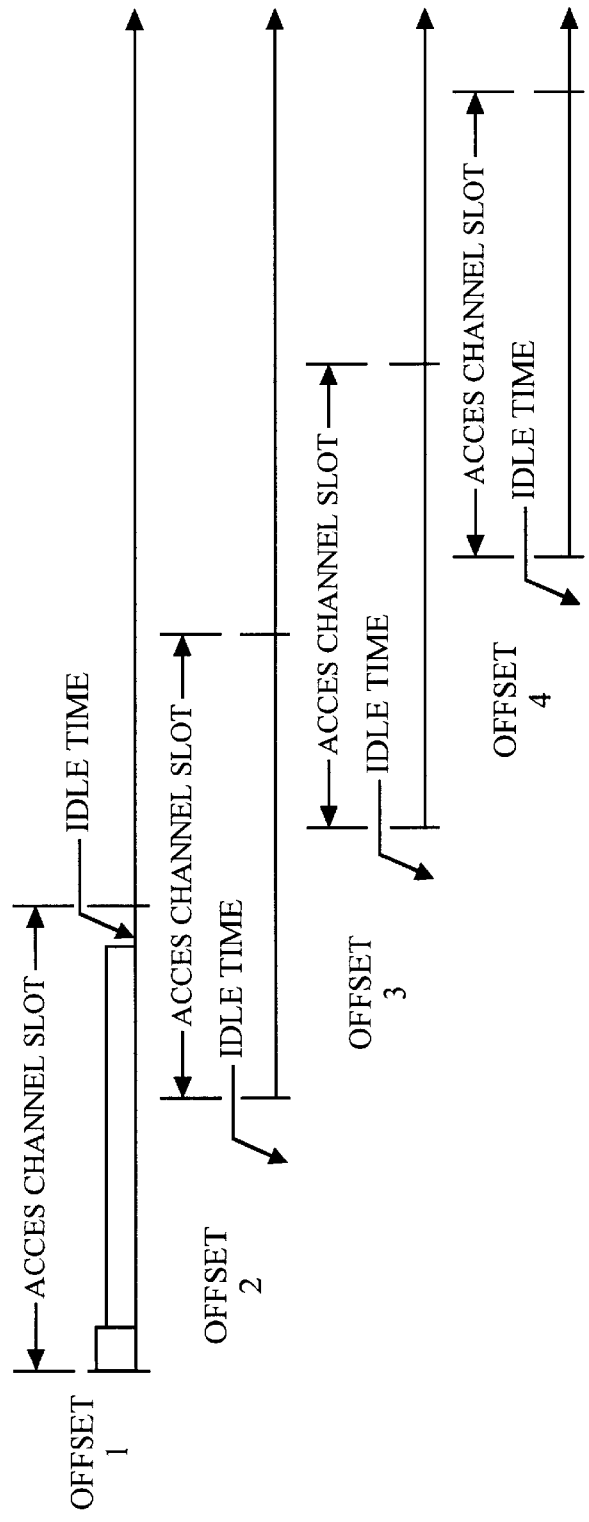
FIG. 6 is a timing diagram showing several staggered access channel time slots each of which has an idle time period associated therewith for regulating access to the various staggered access channel time slots, in accordance with the present invention.
Figure 9:
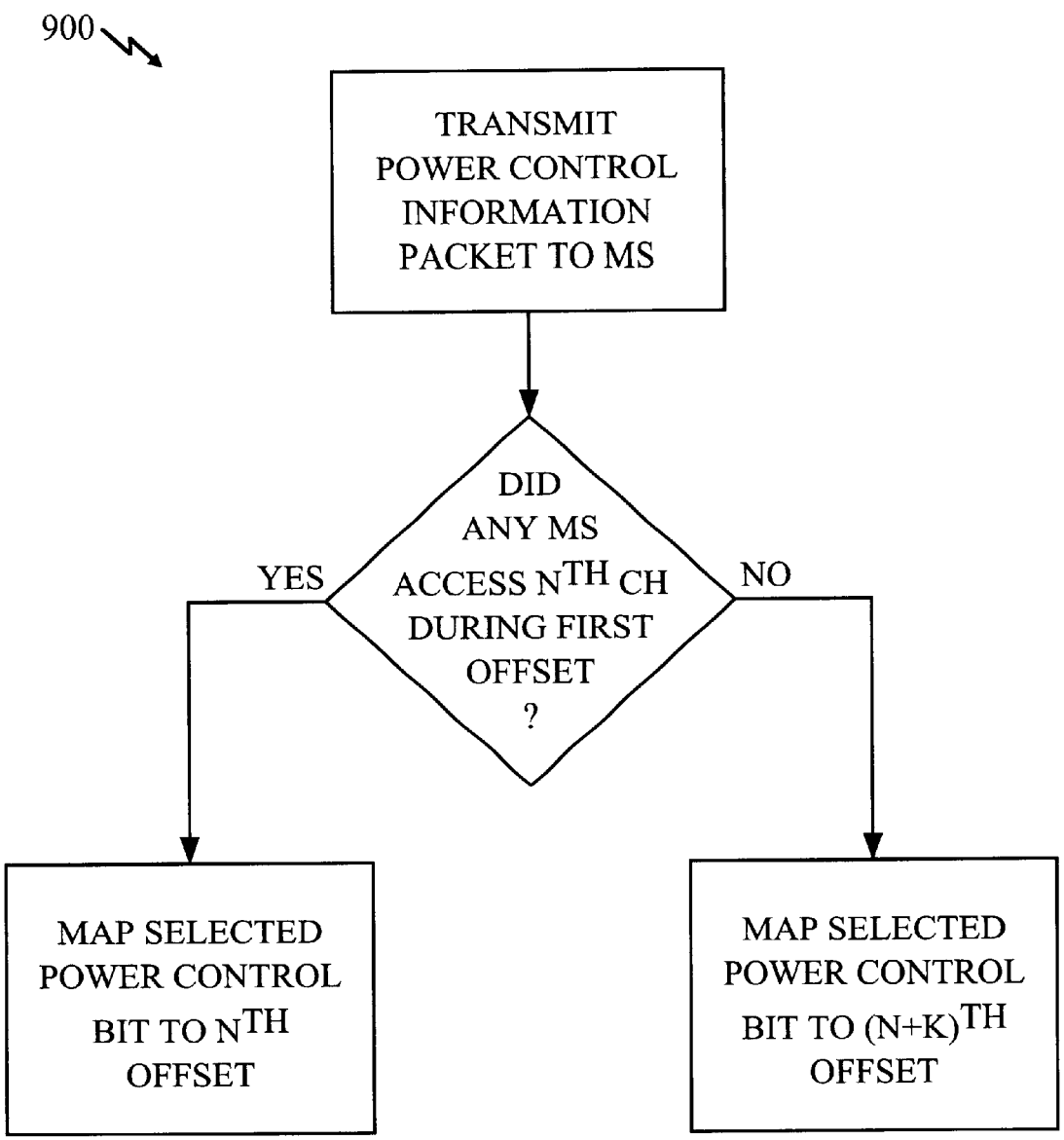
FIG. 9 is a flow diagram of a system for re-using power control bits, in accordance with the present invention.

FIG. 6 shows a case where there are two power control bits for each R-ACH and four possible starting times for that R-ACH (i.e., each R-ACH has four associated time offsets, namely, offset 1, offset 2, offset 3 and offset 4). Initially, power control bits 1 and 2 for a given R-ACH are assigned to offset 1 and offset 2 of the R-ACH, respectively. If a mobile station accesses the given R-ACH during the time interval corresponding to offset 1, then power control bit 1 is used for offset 1 of the given R-ACH. Alternatively, if a mobile station does not access the given R-ACH in the time interval corresponding to offset 1, then power control bit 1 is used to control transmissions beginning on offset 3 associated with the R-ACH. Similarly, the power control bit that is used for offset 2 can be used for offset 4 if there wasn't an access of the R-ACH during offset 2. In accordance with this aspect of the invention, a mobile station desiring to access the given R-ACH at offset 2 will check during the idle time for offset 2 to determine whether the power control bit corresponding to offset 2 is being transmitted. If the power control bit is being transmitted (e.g., if the base station is transmitting zero or 180 degree BPSK symbols for the power control bit), then the mobile station will not access during offset 2. This is just an extension of the rule described previously, namely, if the power control bit is not being transmitted, then the mobile station is permitted to access during offset 2. The power control bit re-use method described above is shown generically in the form of a flow diagram in FIG. 9.

Soft Handoff Of An Access Control Channel

In CDMA systems that function in accordance with the IS-95 standard, an R-ACH is received by a single base station. Accordingly, in such systems several base stations will not receive the R-ACH from a particular mobile station in a soft handoff manner (i.e., a make-before-break handoff), such as is done on a CDMA Traffic Channel when a mobile station moves from a first base station to a second base station. Details of an exemplary CDMA system implementing a soft-handoff on a CDMA Traffic Channel are set forth in U.S. Pat. No. 5,101,501 entitled "Method and Apparatus for Providing A Soft Handoff In A Communications In A CDMA Cellular Telephone System", assigned to the assignee of the present invention and incorporated herein in its entirety by reference. Although a soft-handoff of the R-ACH is not prohibited by the IS-95 standard, it is not known to have been implemented. There are two disadvantages to not implementing soft handoff on the R-ACH. The first is that site diversity is not used, thus reducing the performance of the channel. The second is that reverse power control is not used from multiple sites. As a result, the mobile station will be transmitting more power than is required.

Figure 10:
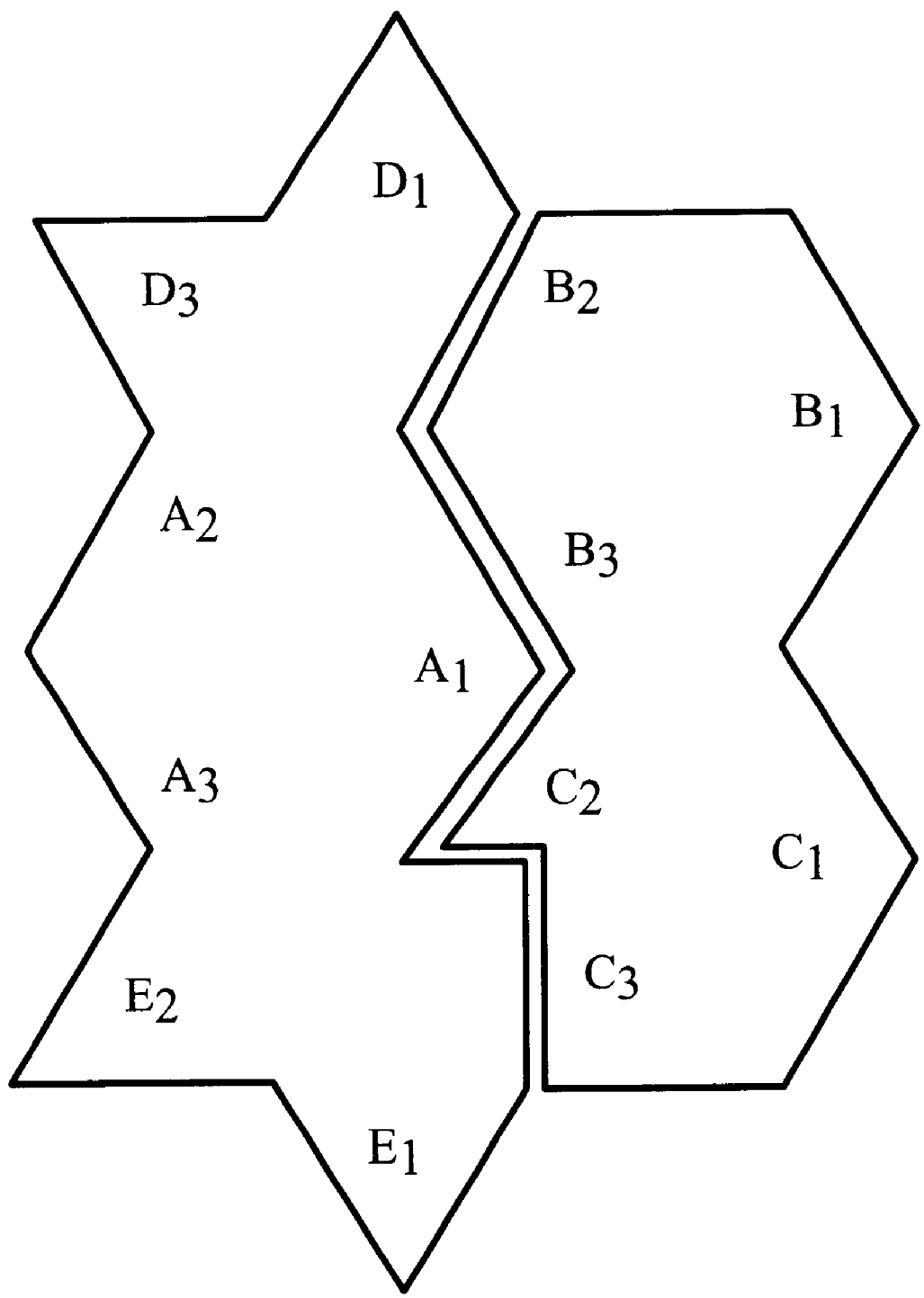
FIG. 10 is a diagram showing several cells in a cellular telephone system each of which has been divided into a plurality of segments, in accordance with the present invention.

There are several difficulties in performing soft handoff on the R-ACH. One is that since the system does not know a-priori which base stations will be needed by a mobile station accessing the system during a handoff, the system would be required to have all base stations in an area surrounding the current base station support the soft handoff. This is illustrated in FIG. 10. Consider the case of a soft handoff of an R-ACH for a mobile station in sector $A_1$. In order to complete such a handoff, sectors $B_3$ and $C_2$ would likely have to receive the R-ACH and $B_2$, $C_3$, $D_1$, $E_1$, $A_2$, $A_3$, $D_3$, and $E_2$ might receive the R-ACH for sector $A_1$. This would certainly be quite a considerable number of additional demodulators at each of these other cell sites, but it is quite possible to have demodulators for each of the sectors or some subset of them. Nonetheless, in order to obtain the full benefit this would require quite a few power control bits to be used on the forward link. However, it should be noted that additional power control bits are not required for sectors at the same site, for example, sectors $A_2$ and $A_3$. This is because the same hardware receives the R-ACH and can thus develop a single power control bit value based upon the reception at the cell site. Thus, the base station in sector $A_1$ can indicate that the power control bits are also being transmitted from other sectors by indicating such in the overhead messages along with the location of the power control bit. For example, consider the power control bit streams shown in FIGS. 11A, 11B and 11C. Here the specific R-ACH is using the power control bit in position 1 for sector $A_1$, the power control bit in position 2 for sector $B_3$ and the power control bit in position 4 for sector $C_2$. It should be noted that these power control bits will arrive at the mobile station at different times so that they will have to be deskewed. This is different than the power control bits on the Traffic Channel in a CDMA system which arrive at the mobile station at the same time from all base stations.

Figure 11A:
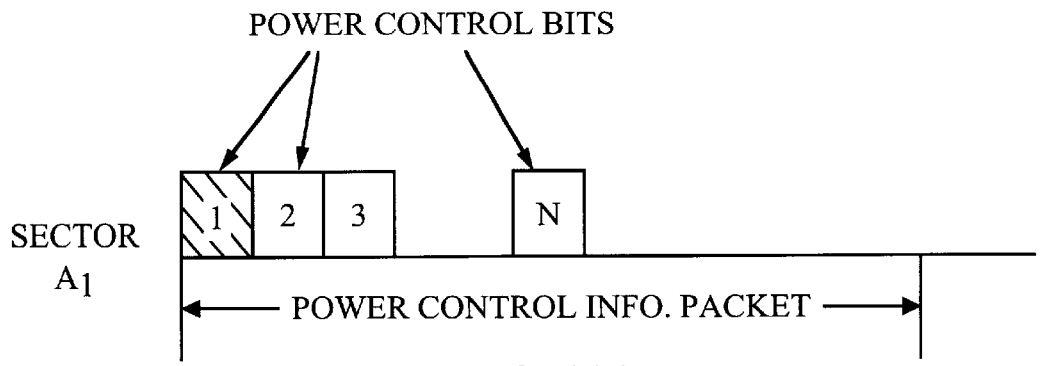
FIGS. 11A, 11B and 11C show the structure of a bit stream formed from a plurality of power control information packets that is used for handing-off access channel transmissions from a first base station to a second base station, in accordance with the present invention.
Figure 11B:
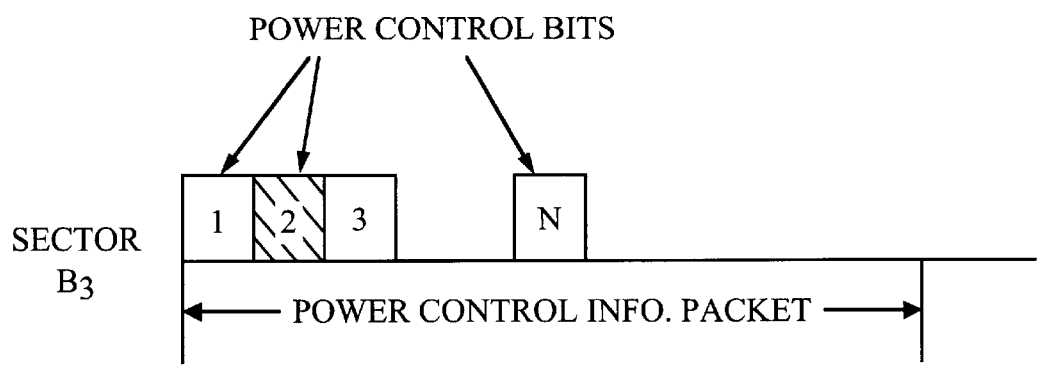
Figure 11C:
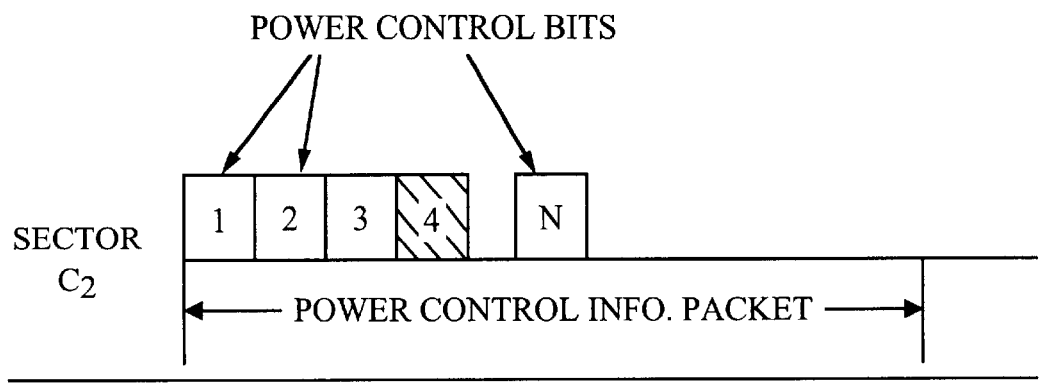
Figure 12:
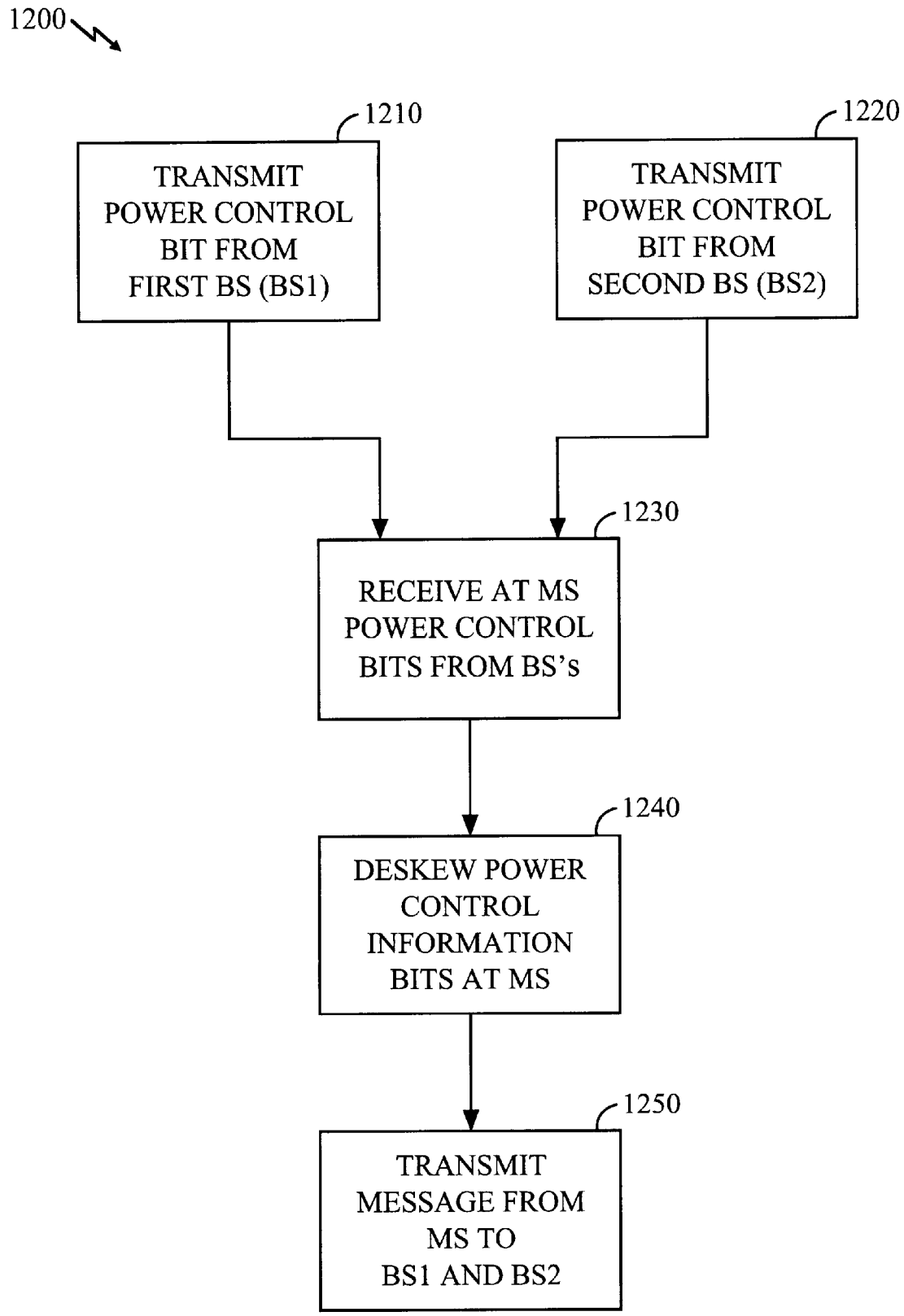
FIG. 12 is a flow diagram of a method for handing-off access channel transmissions from a first base station to a second base station, in accordance with the present invention.

Referring now to FIG. 12, there is shown a flow diagram of a method for soft handoff of an access channel, in accordance with the present invention. In step 1210, at least one power control bit from the first base station is transmitted to the mobile radio. The power control bit from the first base station is transmitted at a first time interval in the power control information packet that corresponds to that associated with the first base station. In step 1220, at least one power control bit from the second base station is also transmitted to the mobile radio unit. The power control bit from the second base station is transmitted at a second time interval in a different position in the power control information packet that corresponds to the same access channel as the first base station, but associated with the second base station. The first power control packet is transmitted from the first base station and the second power control packet is transmitted from the second base station. In step 1230, the mobile radio unit receives the power control bit from the first base station in the power control information packet (such as shown in FIG. 11A) and the power control bit from the second base station in a second power control information packet (such as shown in FIG. 11B). In step 1240, the mobile station forms a power control bit result by deskewing the bits received in step 1230.

The power control bits are handled much as described previously. However, there are several differences. In the case of the mobile station detecting whether the channel is being transmitted, in the preferred embodiment, the mobile station should individually detect whether the power control bits are being transmitted on each separate power control stream. This is done by looking at a sequence of bits as previously described. If all base stations indicate that the mobile station is allowed to transmit (by the power control bits not being transmitted), then the mobile station may enable its transmitter in the method previously described. In the preferred embodiment, the mobile station is required to examine the power control stream separately from each base station. This is because a particular base station may not be able to receive the transmission from a mobile station on the R-ACH. As an example, referring to FIG. 10, a mobile station may be close to the center of the cell covered by base station $A_2$ and thus cannot be received by any other base stations (e.g., $B_3$, $C_2$, $B_2$, $C_3$, $D_1$, $E_1$, $A_2$, $A_3$, $D_3$, and $E_2$). Similarly, when the mobile station is transmitting on the R-ACH, a specific base station may not be transmitting the bit corresponding to the R-ACH, thus the mobile station will not combine the bit that is being transmitted by the base station. It should be noted that this latter consideration is somewhat different than for IS-95 systems on the Traffic Channel. In the IS-95 system, the mobile station knows for certainty the set of base stations that are transmitting on the R-ACH. However, in this case the mobile station may have to detect whether the stream is being transmitted. Once the mobile station has deskewed, determined the phase of the power control bits (and whether they are being transmitted), the mobile station determines whether to increase or decrease its transmit power. This is an extension to the IS-95 method. If those base stations that are transmitting the power control bits all indicate that the mobile station is to increase its transmit power, then the mobile station increases its transmit power; if any base station that is transmitting a power control bits indicates that the mobile station is to decrease its transmit power, then the mobile station decreases its transmit power. In step 1250, the message is transmitted during the handoff from the mobile radio unit. It is received by both the first and the second base stations on the access channel.

System Details

Figure 13:
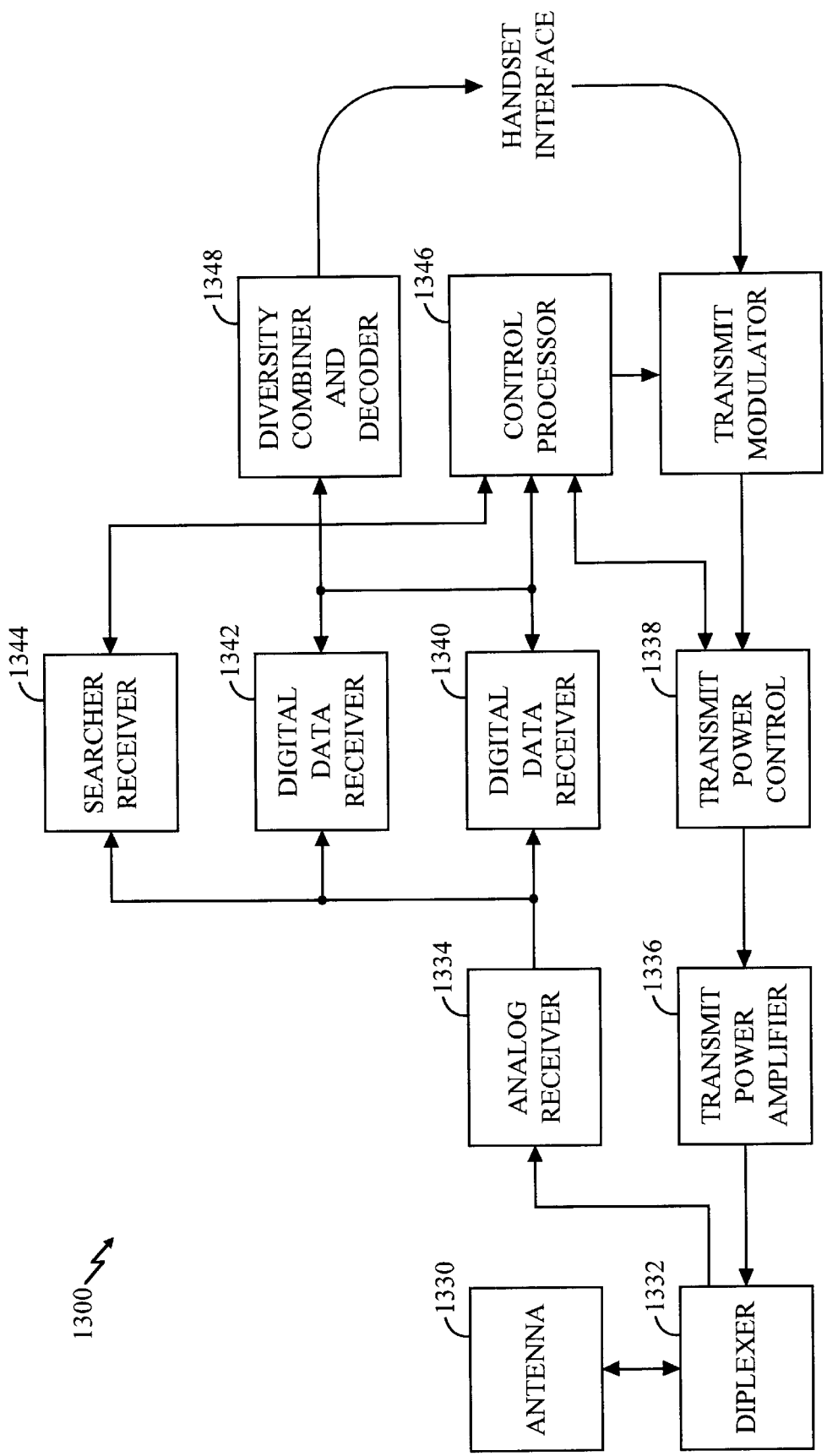
FIG. 13 is a block diagram of showing the components of an exemplary mobile station used for implementing the fast access channel power control systems of the present invention.

Referring now to FIG. 13, there is a block diagram showing the components of an exemplary mobile station 1300 used for implementing the fast access channel power control systems of the present invention. The mobile station includes an antenna 1330 which is coupled through diplexer 1332 to analog receiver 1334 and transmit power amplifier 1336. Antenna 1330 and diplexer 1332 are of standard design and permit simultaneous reception and transmission through a single antenna. Antenna 1330 collects signals transmitted to the mobile station from one or more base stations and provides the signals though diplexer 1332 to analog receiver 1334. Receiver 1334 is also provided with an analog to digital converter (not shown). Receiver 1334 receives RF signals from diplexer 1332, amplifies and frequency downconverts the signals, and provides a digitized output signal to digital data receivers 1340, 1342 and to search receiver 1344. It will be understood that, although in the embodiment in FIG. 13 only two digital data receivers are shown, a low performance mobile station might have only a single digital data receiver while higher performance units will have two or more digital data receivers to permit diversity reception. The outputs of receivers 1340 and 1342 are provided to diversity and combiner circuitry 1338 which time adjusts the two streams of data received from the receivers 1340 and 1342, adds the steams together and decodes the result. Details concerning the operation of the digital data receivers 1340, 1342, the search receiver 1344, and the diversity combiner and decoder circuitry 1348 are described in U.S. Pat. No. 5,101,501 entitled "Method and Apparatus for Providing A Soft Handoff In Communications In A CDMA Cellular Telephone System", which is assigned to the assignee of the present invention and incorporated herein by reference.

An output signal is provided from the decoder 1348 to control processor 1346. In response to this output signal, the control processor 1346 determines the values of the power control bits 120 provided to the mobile station from one or more base stations. The control processor 1346 uses the received power control bits in accordance with the present invention to enable and disable power control signals on the R-ACHs. Thus, in response to the receipt of power control bits indicating that the mobile station should either power-up or power-down (as described above), the control processor 1346 will send signals to the transmit power controller 1338, hereby commanding transmit power controller 1338 to, for example, either increase or decrease the output power level of the transmit amplifier 1336 by either plus or minus 1 db.

Figure 14:
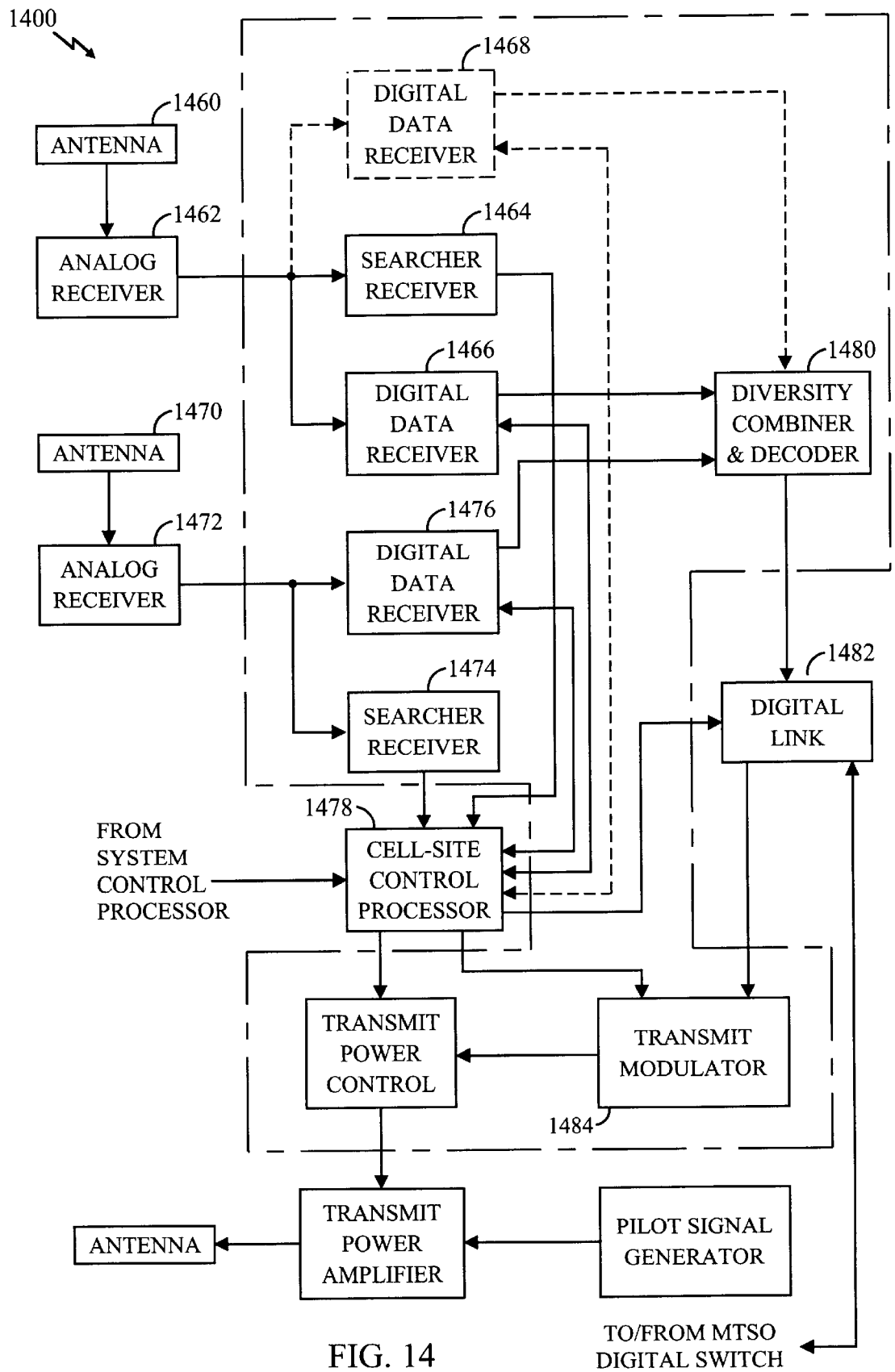
FIG. 14 is a block diagram of showing the components of an exemplary base station used for implementing the fast access channel power control systems of the present invention.

Referring now to FIG. 14, there is shown a block diagram of the components of an exemplary base station 1400 used for implementing the fast access channel power control systems of the present invention. At the base station, two receiver systems are utilized with each having a separate antenna and analog receiver for diversity reception. In each of the receiver systems, the signals are processed identically until the signals undergo a diversity combination process. The elements within the dashed lines correspond to elements corresponding to the communications between the base station and one mobile station. Referring still to FIG. 14, the first receiver system is comprised of antenna 1460, analog receiver 1462, searcher receiver 1464 and digital data receivers 1466 and 1468. The second receiver system includes antenna 1470, analog receiver 1472, searcher receiver 1474 and digital data receiver 1476. Cell-site control processor 1478 is used for signal processing and control during handoff. Both receiver systems are coupled to diversity combiner and decoder circuitry 1480. A digital link 1482 is used to communicate signals from and to a mobile telephone switching office (MTSO) under the control of control processor 1478.

Signals received on antenna 1460 are provided to analog receiver 1462, where the signal are amplified, frequency translated and digitized in a process identical to that described in connection with the mobile station analog receiver. The output from the analog receiver 1462 is provided to digital data receivers 1466 and 1468 and searcher receiver 1464. The second receiver system (i.e., analog receiver 1472, searcher receiver 1474 and digital data receiver 1476) process the received signals in a manner similar to the first receiver system. The outputs of the digital data receivers 1466, 1476 are provided to diversity combiner and decoder circuitry 1480, which processes the signals in accordance with a Viterbi algorithm. Details concerning the operation of the first and second receiver systems and the diversity combiner and decoder 1480 are described in U.S. Pat. No. 5,101,501 entitled "Method and Apparatus for Providing A Soft Handoff In Communications In A CDMA Cellular Telephone System", incorporated above. Signals for transmission to mobile units are provided to a transmit modulator 1484 under the control of processor 1478. Transmit modulator 1484 modulates the data for transmission to the intended recipient mobile station. Among other things, the data signals output from the transmit modulator 1484 will include the power control information bits 120 that are the subject of the present invention.

Although the various embodiments disclosed above have been described in connection with R-ACH channels on CDMA mobile radio systems, it will be understood by those skilled in the art that the teachings of the present invention are applicable to any mobile radio telephone system having access channels that may be accessed by multiple users.

Figure 15:
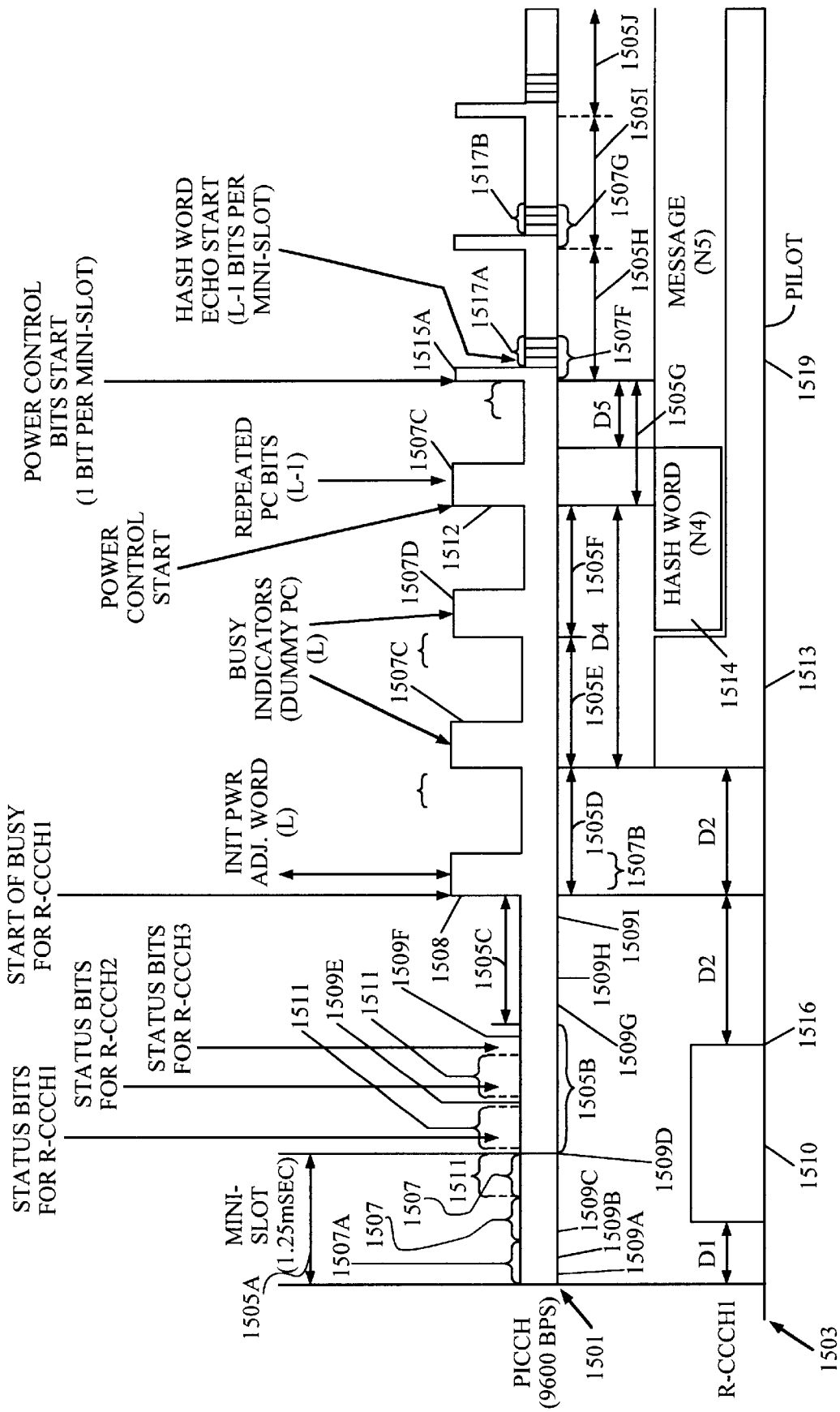
FIG. 15 is an illustration of the way in which a power control channel and a multiple access channel are configured in accordance with one embodiment of the present invention.

FIG. 15 is an illustration of the way in which a power control channel and a multiple access channel are configured in accordance with one embodiment of the present invention. FIG. 15 shows a power inhibit sense control channel ("PICCH") 1501 that operates at 9600 bits per second (bps) and one of three multiple access channels associated with the PICCH 1501, each of the three being referred to herein as a reverse control channel ("R-CCCH") 1503. It should be understood that the rate at which the PICCH 1501 operates is a matter of design choice. Other bit rates may be used and would not alter the concepts that are being disclosed herein. However, a relationship preferably exists between the bit rate of the PICCH 1501 and the rate at which power control information is to be conveyed over the PICCH 1501 to mobile stations that are attempting to access a particular R-CCCH 1503. In accordance with that relationship, the bit rate should be an integer multiple of the power control rate in order for there to be an integer number of bits per "PICCH mini-slot". A PICCH mini-slot is a period of time that is equal to the inverse of the power control rate.

For example, a power control rate of 800 Hz (as shown in FIG. 15) results in a PICCH mini-slot 1505 that has a duration of 1/800=1.25 milliseconds (ms). FIG. 15 shows one R-CCCH 1503 and one PICCH 1501. However, in accordance with the embodiment shown in FIG. 15, the PICCH 1501 is associated with three R-CCCHs. The number of such R-CCCHs 1503 that can be associated with one PICCH 1501 is dependent upon the bit rate, the power control rate, and a parameter referred to herein as "L". L is the number of bits associated with each particular R-CCCH 1503 in each PICCH mini-slot 1505. For example, the bit rate shown in FIG. 15 is equal to 9600 bps, the power control rate is 800 Hz, and the number of bits L shown is equal to 4. Therefore, the number of R-CCCHs 1503 that can be supported is equal to 3. This is because the power control rate is equal to 800 Hz. Accordingly, the duration of each PICCH mini-slot 1505 is equal to 1.25 ms. In addition, the bit rate is 9600 bps. Therefore, in a period of 1.25 ms (i.e., in one PICCH mini-slot) there will be 12 bits. If there are 4 bits associated with each R-CCCH 1503, then there are sufficient bits in each PICCH mini-slot 1505 for 3 R-CCCHs 1503.

Alternatively, the number of R-CCCHs 1503 can be used to determine the value of L. In FIG. 15, since the PICCH 1501 is operating at 9600 bps, and the power control rate is assumed to be 800 Hz, there are 12 bits in each PICCH mini-slot 1505. Since there are three R-CCCHs (only one shown) associated with the PICCH 1501 in FIG. 15, the value of L=4=12/3. That is, each PICCH mini-slot 1505 preferably provides an equal number of bits L for each of the R-CCCHs 1503 that are associated with the PICCH 1501. In the embodiment shown in FIG. 15, each PICCH mini-slot 1505 includes three "sub-mini-slots" 1507. A sub-mini-slot 1507 is equal to L bits. The first sub-mini-slot 1507a begins at the beginning of the PICCH mini-slot 1505. Each subsequent sub-mini-slot 1507 begins in the bit position that follows the last bit of the previous sub-mini-slot 1507. Generally, each sub-mini-slot 1507 includes a first power control bit 1509, followed by L−1 "hash" value bits 1511. Definition of the hash values carried by the hash value bits 1511 is provided further below. It should be noted that the PICCH 1501 may be modulated in quadrature with another channel of the system.

Each R-CCCH 1503 that is associated with the PICCH 1501 is divided into R-CCCH mini-slots (not shown). The R-CCCH mini-slots indicate the relative times at which particular events in the R-CCCH can occur. R-CCCH mini-slots are preferably aligned with the PICCH mini-slots 1505 of the PICCH. However, an alignment delay ("D1") can be implemented which offsets the beginning of each R-CCCH mini-slot from the beginning of a PICCH mini-slot 1505.

Furthermore, in accordance with one embodiment of the present invention, each R-CCCH begins at a time which is determined with respect to the beginning of the sub-mini-slot 1507 associated with that R-CCCH. Therefore, the timing of the R-CCCH associated with the second sub-mini-slot 1507 will be offset from the timing of the R-CCCH associated with the first sub-mini-slot 1507a by the duration of one sub-mini-slot.

R-CCCH mini-slots have a duration that is preferably equal to the duration of the PICCH mini-slots 1505 of the PICCH 1501. However, in an alternative embodiment, the R-CCCH mini-slots have a duration that is equal to an integer multiple of the PICCH mini-slots 1505. It should be noted that the some of the bits are shown in FIG. 15 to be higher than others. Higher bits are intended to indicate that energy is being transmitted, whereas lower bits are intended to indicate that no energy is being transmitted. The relative height of each is not intended in any other way to convey relative power of one bit with respect to another.

The function of the each of the bits of the sub-mini-slot 1507 depends upon the status of the associated R-CCCH. In accordance with one embodiment of the present invention, the bits are modulated using on-off binary phase shift keying (BPSK). BPSK means that energy may be transmitted at each bit time. That energy is typically modulated as a sinusoid having one of two phase relationships with respect to a sinusoidal phase reference (e.g., 0 degrees from the reference phase or 180 degrees from the reference phase). The fact that the information is "on-off" BPSK further refers to the fact that it is also possible that no energy be transmitted during the bit time.

The sub-mini-slot bit functions are defined as follows. Each of the bits within the first sub-mini-slot 1507 of each PICCH mini-slot 1505 is associated with, and dedicated to, the first R-CCCH 1503. Each of the bits within the second sub-mini-slot 1507 of each PICCH mini-slot 1505 is associated with, and dedicated to, the second R-CCCH 1503. Each subsequent sub-mini-slot 1507 is dedicated to one associated R-CCCH 1503.

Initially, when the associated R-CCCH 1503 is not being used by any mobile station, each of the bits in the sub-mini-slot 1507 are "idle" (i.e., no energy is transmitted during that bit time). Transmission of an idle bit in the first bit position 1508 of the sub-mini-slot 1507 is indicative of the fact that no mobile station has yet attempted to gain access to the associated R-CCCH 1503.

To gain access to an R-CCCH 1503, a mobile station determines whether the first bit of the sub-mini-slot 1505 associated with that R-CCCH 1503 is idle. In accordance with one embodiment of the present invention, the mobile determines whether the channel is idle or busy by adding the absolute value of the soft decisions on the control bits, computing the resulting energy-to-total-interference ratio and comparing this to a system specified threshold. The channel is considered to be "busy" if the measured ratio exceeds the threshold.

If the first bit in the sub-mini-slot 1505 associated with the R-CCCH 1503 is busy (energy is being transmitted in that bit position), then the mobile looks for another R-CCCH 1503 to access. In accordance with one embodiment, the mobile does nothing for a random backoff time which is selected according to the system parameters, after which it repeats the algorithm starting with selection of one of the R-CCCHs 1503.

If the first bit in the sub-mini-slot 1507 associated with the R-CCCH 1503 is idle, then the mobile transmits an initial preamble 1510 over the R-CCCH 1503 to which the mobile station would like to gain access. In accordance with one embodiment of the present invention, the initial preamble is not transmitted every time the R-CCCH 1503 is determined to be idle. Rather, the mobile transmits the preamble a predetermined percentage of the time (i.e., with a probability of "p", where p is determined as a system parameter). This is commonly referred to as a "persistence-p" scheme. Such persistence-p schemes reduce the likelihood that more than one mobile will attempt to transmit a preamble at the same time. The preamble is encoded with a pseudo-random number (PN) code that is delayed by a random number of "chips" (i.e., units of information). In one embodiment, the delay is equal to 512 chips. The preamble is preferably a fixed known pattern. In one embodiment the preamble includes some indication of the data rate. If the mobile does not transmit in response to the persistence determination, the mobile will then examine the busy status of the next mini-slot to determine whether to transmit the preamble. If the first bit in the sub-mini-slot 1507 of the next mini-slot 1505 is idle, then the mobile will transmit during the next R-CCCH mini-slot with a probability of p. This process repeats until the transmission occurs. If the mobile determines that the first bit in the sub-mini-slot 1507 associated with the R-CCCH 1503 is busy, then the mobile behaves in the same way that the mobile would if the R-CCCH 1503 were determined to be busy the first time.

In accordance with one embodiment of the present invention, the preamble may be transmitted in bursts (i.e., the preamble may be sent as a number of discrete portions, with a delay between each such portion). Alternatively, the preamble may be repeated in its entirety with a delay between the transmission of each repetition.

In accordance with one embodiment of the present invention, a rate word 1516 is transmitted directly after the preamble 1510. The rate word 1516 indicates to the base station the rate at which the mobile station is requesting to send information if granted access to the R-CCCH 1503. It should be understood that the rate determination can be made in a number of alternative ways, and that the timing of the transmission of the rate word need not be such that the rate word 1516 follows directly after the preamble 1510. One alternative way in which rate determination can be made is by encoding the preamble with a code that is unique to the particular rate. Another way is encode the preamble in such a way as to make the error rate greater if the base station attempts to decode the preamble at the wrong rate. The base station will attempt to decode the preamble using each rate at which the mobile could have encoded the preamble. The attempt to decode the preamble that results in the best error rate is then determined to be the correct rate.

When a mobile station transmits an initial preamble 1510 to the base station over the R-CCCH 1503, the base station receives that energy. If the base station can determine the rate at which the mobile is requesting to send data over the R-CCCH 1503, then the base station responds by determining whether the amount of energy that was received is appropriate to the bit rate at which the mobile is requesting to send information over the R-CCCH 1503. That is, the base station determines whether the signal to noise ratio of the preamble is appropriate (not too great, nor too low) to support data transmission at the requested rate with a desired error rate. If the received power level is greater than or less than the desired power level for the requested data rate, then the base station calculates the amount of adjustment needed to make the power level appropriate. It should be noted that in one embodiment of the present invention, power control is performed on the pilot signal and not on the traffic signal.

The rate at which the data is to transmitted is taken into account by the mobile station which adjusts the value of the initial power adjust word based upon the rate at which the mobile station will be transmitting the message.

Once the base station has determined how much adjustment is desirable in the power level of the signal transmitted from the base station (i.e., the amount of energy to be transmitted by the mobile station), the base station will transmit an initial power adjustment word 1507b over the PICCH 1501 using bits that are "pre-assigned". Pre-assignment of the bits means that the significance of the bits at relative locations within the sub-mini-slot 1507 is predetermined. In the embodiment shown in FIG. 15, all four bits of the sub-mini-slot 1507b are predetermined to carry the initial power adjustment word. However, in an alternative embodiment, the initial power adjustment word 1507b is number of bits in length, not to exceed L. If the number of bits divides evenly into the number L, but is less than L, then in accordance with one embodiment of the present invention, the initial power adjustment word 1507b is repeated as many times as possible in the L bits of the sub-mini-slot 1507. The presence of energy in the first bit 1508 of the sub-mini-slot 1507b indicates to those mobile stations that will receive the PICCH 1501 that the R-CCCH 1053 associated with that sub-mini-slot 1507b is "busy". It should be noted that more than one bit is preferably used to indicate the initial power adjustment. Accordingly, as will be seen further below, at least some of the bits that are pre-assigned to the initial power adjustment word are later pre-assigned to echo the hash value after the hash word has been received.

A delay, referred to as the "base detection delay" (D2), occurs between the end of the initial preamble at the mobile station and the start of the transmission of the initial power adjustment word 1507b. This delay is an integer multiple of PICCH mini-slots 1505. In one embodiment of the present invention, the Base Detection Delay is between 0 and 15 PICCH mini-slots in duration. It should be noted that by transmitting an initial preamble 1510 and waiting to get back an initial power control adjustment word 1507b, the base station can set the power level of the mobile prior to transmission of information at the desired bit rate. This is advantageous, since the preamble may be transmitted at lower power level than the information due to the fact that the bit pattern of the preamble is known and is repetitive. This, in combination with the fact that the preamble is being received coherently, allows energy to be coherently integrated over the duration of the preamble.

After transmitting the preamble, and rate word if used, the mobile will attempt to decode the sub-mini-slot associated with the requested R-CCCH 1503. As shown in FIG. 15, there should not be any power transmitted in the sub-mini-slots 1505c that occur before the end of the base detection delay D2 (which is preferably a predetermined system parameter). Therefore, if the mobile station detects power in a sub-mini-slot 1505c which occurs during the base detection delay D2, the mobile station will assume that another mobile station has been granted access to the R-CCCH associated with that sub-mini-slot 1507.

After the base detection delay D2, the mobile station should be able to detect the initial power adjustment word. If the mobile station is unable to detect the initial power adjustment word 1507b, then the mobile station will preferably assume that the access attempt has failed and attempt to access again, beginning with selecting a R-CCCH 1503 over which the mobile station wishes to transmit. As is the case at each other stage of the process, if the mobile station determines that the attempt has failed, then the mobile station will preferably back off for a random amount of time and try to access again.

If the mobile station is able to detect the initial power adjustment word, then the mobile station assumes that the base station has detected the preamble 1510 transmitted by the mobile station. However, it may be possible that a preamble 1510 that was transmitted by another mobile station was detected by the base station. This condition is remedied as detailed further below. In either case, at the end of the PICCH mini-slot 1505d that includes the initial power adjustment word 1507b, the mobile station preferably begins transmitting a channel estimation preamble 1513. The power at which the mobile station transmits the channel estimation preamble is responsive to the value of the received initial power adjustment word. In addition, the mobile station adjusts its transmit power in response to the data rate that is to be used on the R-CCCH 1503. The amount of time that elapses between the end of the PICCH mini-slot 1505d and the beginning of the channel estimation preamble 1513 is shown in FIG. 15 to be one PICCH mini-slot in duration. However, in an alternative embodiment, a "mobile hold delay" (D3) having a duration that is any integer multiple of the duration of a PICCH mini-slot 1505 may be imposed. Likewise, the channel estimation preamble 1513 is shown to be equal in duration to one PICCH mini-slot 1505. However, in an alternative embodiment, the duration of the channel estimation preamble 1513 is equal the duration of any integer multiple of PICCH mini-slots 1505.

After the transmission of the channel estimation preamble, a "hash" word 1514 is transmitted which has a hash value derived from information that is unique to the transmitting mobile station. The hash value is generated by a hash function that maps unique input information of a first length into an output hash value of a length that is shorter than the length of the input information. For example, in one embodiment of the present invention, the input information includes the electronic serial number (ESN) of the mobile station. The ESN is unique to each mobile station. However, the ESN is relatively long. The hash function maps the ESN to a hash value that is shorter (requires less bits) than the ESN. The hash word 1514 assists the mobile and the base station in determining which mobile station will be granted access to the R-CCCH 1503.

Since the hash value is derived from information that is unique to the mobile station, each mobile station will generate a "quasi-unique" hash value. The hash values will be quasi-unique to each mobile station because the length of the hash word 1514 is preferably too short to allow for a sufficient number of unique hash values to accommodate all of the mobiles stations that are in operation throughout the world. Nonetheless, the length of the hash word 1514 is sufficient to make it unlikely that more than one mobile station in the same operating area (i.e., in communication with the same base station) will generate the same value. The use of this hash word 1514 allows less information to be transmitted than is required to uniquely distinguish the mobile that has gained access to the R-CCCH 1503 from every other mobile station that is currently in operation throughout the world, while still distinguishing that mobile station from all others in the area in most cases. In one embodiment of the present invention, the hash value is repeated in order to ensure that it is correctly decoded by the mobile station. If, at any time during the reception of the hash word, the mobile station determines that the hash value being received is not the hash value that was transmitted by that mobile station, then the mobile ceases transmitting on the R-CCCH 1503 and assumes that the access attempt has failed. Depending upon the power level received by the mobile station, the mobile station can make a determination as to how reliable each bit of the hash value is and whether to terminate the transmission on the R-CCCH in response to bit being received in error in the hash value. At some point, the mobile will terminate transmission if the have value received is not the hash value transmitted. In accordance with one embodiment, the hash word can be suppressed (i.e., not transmitted in the R-CCCH 1503).

After the hash word 1514 is transmitted, the mobile transmits a message. The message contains the user content that is to be transmitted between the mobile station and the base station.

It should be noted that each of the sub-mini-slots 1507c, 1507d, that are transmitted during a "power control delay" (D4) are "dummy" bits. Dummy bits have no significance when received by the mobile station other than as place holders and to indicate that the R-CCCH 1503 is busy. The power control delay D4 is the time between the beginning of the channel estimation preamble and the start of power control information. This delay is preferably present because of the need for time in the base station to determine the proper power control value. Therefore, the first power control bit 1512 that is used by the mobile station is sent during sub-mini-slot 1507e, which occurs after the power control delay D4.

It should be noted that in accordance with one embodiment of the present invention, there is only one power control bit in each sub-mini-slot 1507, with the exception of the initial power control bits 1508 described above. In the embodiment shown in FIG. 15, the first bit within the sub-mini-slot is the power control bit. However, in an alternative embodiment, the power control bit may be any one of the bits in the sub-mini-slot 1507. Furthermore, in an alternative embodiment, more than one power control bit is used to indicate the how much the mobile should adjust the power that is to be transmitted on the R-CCCH 1503. In the embodiment in which there is only one power control bit, the value of the power control bit is preferably repeated for each of the remaining bits of the sub-mini-slot 1507e, since the hash value is not known at the time that the sub-mini-slot 1507e is transmitted.

A "hash code delay" D5 occurs after the entire hash word 1514 has been received. The hash code delay D5 is shown to be equal to the remainder of the PICCH mini-slot 1505g. However, in an alternative embodiment, the hash code delay extends beyond the beginning of the next PICCH mini-slot by a duration equal to the duration of an integer multiple of PICCH mini-slots. Accordingly, the hash code delay D5 may be specified such that it has a duration that lasts until the beginning a PICCH mini-slot 1505 that begins after the entire hash word 1514 has been received.

In response to the receipt of the hash word 1514 and a determination by the base station that the mobile that has transmitted that hash word 1514 is to be given access to the R-CCCH 1503, the base station transmits a power control bit. The power control bit indicates that the R-CCCH 1503 associated with that sub-mini-slot 1507 is busy and whether the mobile should adjust the output power transmitted on the R-CCCH 1503 either up or down. As shown in FIG. 15, the power control bit 1515a is transmitted as the first bit in the sub-mini-slot 1507f. As noted above, in an alternative embodiment, the power control bit is located in a bit position other than first bit position in the sub-mini-slot 1507f. In the embodiment shown in FIG. 15, a stream of bits 1517a that represent a portion of the hash function follow the power control bit. This stream of bits 1517a is preferably equal in length to the sub-mini-slot minus one (i.e., minus the power control bit). Therefore, the combination of the power control bit and the stream of bits which, represent the hash function comprise the complete sub-mini-slot 1507f.

In the embodiment shown in FIG. 15, the length of the hash word 1514 is greater than the number of bits in one sub-mini-slot 1507. Therefore, only the first three bits 1517a of the hash value follow the power control bit 1515a in the sub-mini-slot 1507f. The next three bits 1517b of the hash value 1514 follow the power control bit 1515b in the next sub-mini-slot 1507g associated with the same R-CCCH 1503 as the sub-mini-slot 1507f. Each subsequent sub-minislot 1507 carries three additional bits until the entire hash value is sent. In accordance with one embodiment, the hash value is repeated in order to ensure that the all mobiles know whether they have been granted access to the R-CCCH 1503 associated with the sub-mini-slot that carries the hash word 1514. This process of repeating the hash value in the PICCH is known as "echoing" the hash value.

In one embodiment of the present invention, the hash word 1514 may not have been completely received before the end of the power control delay D4. Therefore, in one such embodiment, the hash word cannot be echoed until after the hash code delay D5.

In an alternative embodiment of the present invention, each sub-mini-slot within the PICCH is encoded over the entire mini-slot 1505 using a different orthogonal code. Additionally, the R-CCCH associated with each sub-minislot has the same timing. In yet another alternative embodiment, each R-CCCH is dedicated to a particular bit rate. Accordingly, one of the determining factors in selecting which R-CCCH the mobile station desires to transmit on will be the bit rate that is desired. Still further, in one embodiment of the present invention, some, or all, of the system parameters may be programmable. These parameters include: (1) persistence; (2) retransmission delay (i.e., the amount of time between the mobile finding that the channel is busy and the time that the transmission is rescheduled; (3) number of PICCH channels in a system; (4) a mapping code which shows how supported R-CCCHs map to specific sub-mini-slots; (5) R-CCCH mini-slot offset (difference between the beginning of a PICCH mini-slot and a R-CCCH mini-slot); (6) preamble length; (7) rate word length, if used; (8) base detection delay D2; (9) Initial power adjustment word length; (10) mobile hold delay D3; (11) channel estimation preamble duration; (12) hash word length; (13) number of hash word echoes; (14) power control delay D4; (15) hash code delay D5; and (16) maximum message length.

In another embodiment of the present invention, the power control rate can be altered in order to change the length of the PICCH mini-slot. In another alternative embodiment, the use of more than one power control bit in a sub-mini-slot allows the energy of more than one bit to be coherently integrated over time in order to better determine the value of the power control bits using less energy per bit.

Figure 16:
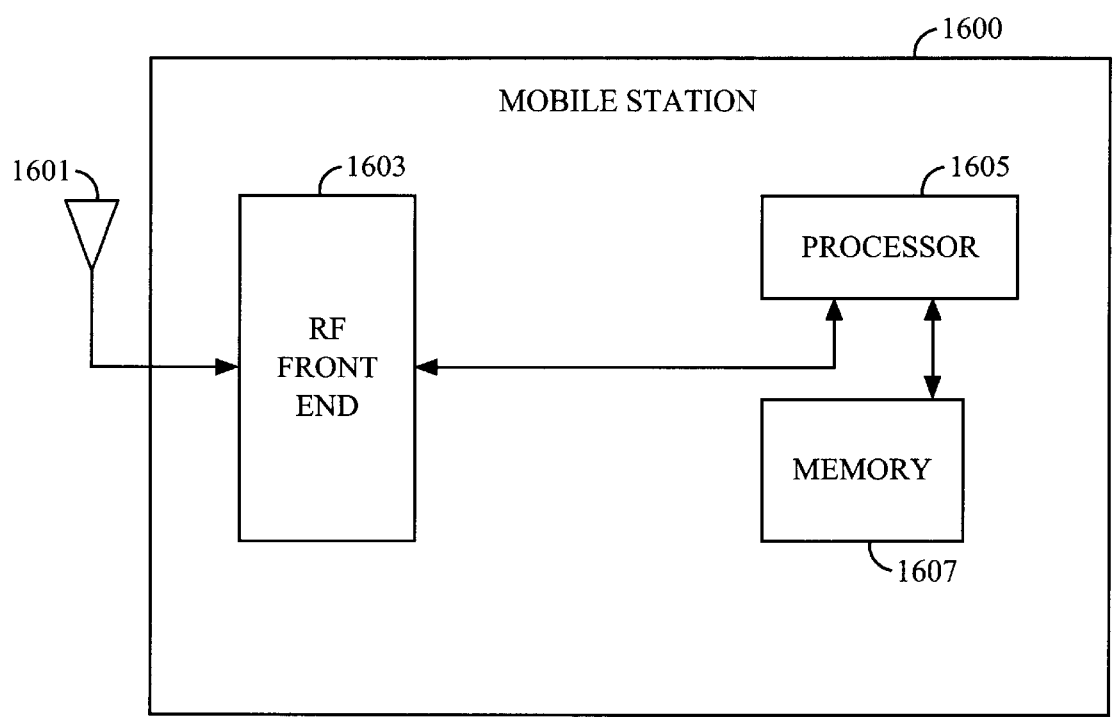
FIG. 16 is a simplified block diagram of a mobile station 1600 in accordance with the present invention.

FIG. 16 is a simplified block diagram of a mobile station 1600 in accordance with the present invention. The mobile station 1600 includes an antenna 1601, a radio frequency (RF) front end section 1603, a processor 1605, and a memory 1607. Essentially, all of the functions of the present invention are performed by the processor 1605 which preferably receives digital information from the RF front end 1603. The memory 1607 stores system parameters and instructions which are executed by the processor 1605. The processor 1605 also transmits information from on the R-CCCH 1503. The information is generated by the processor 1605.

Softer handoff may be facilitated at the mobile by transmitting specific subchannel(s) of the F-PICCH in a simulcast manner on sectors (pairs or all sectors) of a cell. The system would need to specify which F-PICCH subchannels (and corresponding R-CCCH's) are supported in the simulcast mode. One or multiple simulcast subchannels could be supported in a cell. The mobile preferably makes a decision to use a simulcast channel based on differential pilot strengths of the sectors. The performance of users in this softer handoff zone will be greatly improved.

In accordance with one embodiment, a special auxiliary F-PICCH is defined for use on other sectors of a cell. The first busy on it is communicated, going idle again immediately thereafter. Accordingly, the load would be extremely low, and it would be used only by users attempting to determine if the channel is busy at the correct time. The aux F-PICCH would not be used by users monitoring the channel for the initial idle.

The previous description of the preferred embodiments is provided to enable any person skilled in the art to make or use the present invention. The various modifications to these embodiments will be readily apparent to those skilled in the art, and the generic principles defined herein may be applied to other embodiments without the use of inventive faculty. Thus, the present invention is not intended to be limited to the methods and apparatuses shown herein but is to be accorded the widest scope consistent with the claims set forth below.

What is claimed is:

1. A method of communicating between a mobile station and a base station on an access channel, comprising:

transmitting a plurality of power control bits in a power control information packet from the base station;

mapping a position of each power control bit of the plurality of power control bits to a separate offset of a plurality of offsets within the access channel; and receiving the plurality of power control bits at the mobile station.

2. The method of claim 1, further comprising setting a power control bit of the plurality of power control bits to a state indicating that the mobile station is to increase its output power level on an access channel at an offset of the plurality of offsets within the access channel in response to the position of the power control bit of the plurality of power control bits that is mapped to the offset of the plurality of offsets within the access channel.

3. The method of claim 1, further comprising setting a power control bit of the plurality of power control bits to a state indicating that the mobile station is to decrease its output power level on an access channel at an offset of the plurality of offsets within the access channel in response to the position of the power control bit of the plurality of power control bits that is mapped to the offset of the plurality of offsets within the access channel.

4. The method of claim 1, further comprising:

transmitting a first message from the mobile station on the access channel at a first offset within the access channel at a first power level determined in response to the position of a first power control bit of the plurality of power control bits that is mapped to the first offset of the plurality of offsets within the access channel;

receiving the plurality of power control bits at another mobile station; and transmitting a second message from the another mobile station on the access channel at a second offset of the plurality of offsets within the access channel at a second power level determined in response to the position of a second power control bit of the plurality of power control bits that is mapped to the second offset of the plurality of offsets within the access channel.

5. The method of claim 1, further comprising setting a power control bit of the plurality of power control bits to a state that indicates an operation to be performed at the mobile station.

6. The method of claim 1, further comprising setting a power control bit of the plurality of power control bits to a state indicating initiating transmission of a message from the mobile station on the access channel at an offset of the plurality of offsets within the access channel at a power level determined in response to the position of the power control bit of the plurality of power control bits that is mapped to the offset of the plurality of offsets within the access channel.

7. The method of claim 1, further comprising setting a power control bit of the plurality of power control bits to a state indicating inhibiting initiation of transmission of a message from the mobile station on the access channel at an offset of the plurality of offsets within the access channel at a power level determined in response to the position of the power control bit of the plurality of power control bits that is mapped to the offset of the plurality of offsets within the access channel.

8. The method of claim 5, further comprising performing the operation at the mobile station indicated by the power control bit of the plurality of power control bits.

9. The method of claim 6 further comprising initiating transmission of the message from the mobile station on the access channel at the offset of the plurality of offsets within the access channel at the power level determined in response to the position of the power control bit of the power control bits that is mapped to the offset of the plurality of offsets within the access channel.

10. The method of claim 7, further comprising inhibiting initiation of transmission of the message from the mobile station on the access channel at the offset of the plurality of offsets within the access channel at the power level determined in response to the position of the power control bit of the plurality of power control bits that is mapped to the offset of the plurality of offsets within the access channel.

11. The method of claim 9, further comprising increasing the mobile station's output power level on the access channel at the offset of the plurality of offsets within the access channel in response to the position of the power control bit of the plurality of power control bits that is mapped to the offset of the plurality of offsets within the access channel.

12. The method of claim 9, further comprising setting the power control bit of the plurality of power control bits to a state indicating ceasing transmission of the message from the mobile station on the access channel at the offset of the plurality of offsets within the access channel at the power level determined in response to the position of the power control bit of the plurality of power control bits that is mapped to the offset of the plurality of offsets within the access channel.

13. The method of claim 12, further comprising ceasing transmission of the message from the mobile station on the access channel at the offset of the plurality of offsets within the access channel at the power level determined in response to the position of the power control bit of the plurality of power control bits that is mapped to the offset of the plurality of offsets within the access channel.

14. The method of claim 9, further comprising decreasing the mobile station's output power level on the access channel at the offset of the plurality of offsets within the access channel in response to the position of the power control bit of the plurality of power control bits that is mapped to the offset of the plurality of offsets within the access channel.

15. A mobile station, comprising:
an antenna configured to receive and transmit a signal at an offset on an access channel;
a diplexer configured to couple the antenna to a receiver and a transmitter;
the receiver configured to receive a signal from the antenna through the diplexer and decode the signal to produce a power control bit value of a plurality of power control bits within the signal, using a mapping of the position of each power control bit of the plurality of power control bits to a separate offset of a plurality of offsets within the access channel, wherein the position of the power control bit value corresponds to the offset on the access channel; and
the transmitter coupled to the receiver, said transmitter configured to transmit a message from the mobile station on the access channel at the offset of the plurality of offsets within the access channel at a power level determined in response to the power control bit value.

16. A mobile station, comprising:
an antenna configured to receive and transmit a signal at an offset on an access channel;
a diplexer configured to couple the antenna to a receiver and a transmitter;
the receiver configured to:
receive signals from the antenna through the diplexer,
amplify, frequency downconvert, and digitize the signals to produce digitized signals,
provide a plurality of data streams from the digitized signals,
time adjust the plurality of data streams,
add the plurality of data steams to produce a combined data stream; and
decode the combined data stream to produce a power control bit value of a plurality of power control bits within the combined data stream, using a mapping of a position of each power control bit of the plurality of power control bits to a separate offset of a plurality of offsets within the access channel, wherein the position of the power control bit value corresponds to the offset on the access channel; and
the transmitter coupled to the receiver, said transmitter configured to transmit a message from the mobile station on the access channel at the offset of a plurality of offsets within the access channel at a power level determined in response to the power control bit value.

17. A mobile station, comprising:
an antenna configured to receive and transmit a signal at an offset on an access channel;
a diplexer configured to couple the antenna to an analog receiver and a transmit power amplifier;
the analog receiver configured to receive signals from the antenna through the diplexer and amplify and frequency downconvert the signals, and provide a digitized output signal to a plurality of digital data receivers;
a plurality of digital data receivers, each configured to provide a stream of data from the digitized output signal;
a diversity combiner configured to time adjust the plurality of data streams and add the plurality of data steams;

a decoder configured to decode a result from the combined plurality of data streams, and provide the decoded result to a control processor;

the control processor coupled to the decoder, said control processor configured to:
  receive the decoded result,
  determine, from the decoded result, a power control bit value of a plurality of power control bits within the decoded result, using a mapping of a position of each power control bit of the plurality of power control bits to a separate offset of a plurality of offsets within the access channel, wherein the position of the power control bit value corresponds to the offset on the access channel; and
  provide a signal to a transmit power controller to change an output power level of a transmit amplifier in response to the power control bit value of the plurality of power control bits;

the transmit power controller coupled to the control processor and configured to change an output power level of a transmit power amplifier in response to a signal from the control processor; and the transmit amplifier coupled to the transmit power controller and configured to transmit a message from the mobile station on the access channel at the offset of a plurality of offsets within the access channel at a power level determined in response to the transmit power controller.

18. A method of controlling output transmit power of a mobile station, comprising:

transmitting a plurality of power control bits in a power control information packet from a base station;

mapping a position of each power control bit of the plurality of power control bits to a separate offset of a plurality of offsets within an access channel;

receiving the plurality of power control bits at the mobile station; and transmitting a message from the mobile station on an access channel at an offset within the access channel at a power level determined in response to the position of a power control bit of the plurality of power control bits that is mapped to the offset of the plurality of offsets within the access channel.

* * * * *